US011157976B2

(12) United States Patent
Touboul et al.

(10) Patent No.: US 11,157,976 B2
(45) Date of Patent: Oct. 26, 2021

(54) SYSTEMS AND METHODS FOR PROVIDING DIGITAL CONTENT MARKETPLACE SECURITY

(71) Applicant: CUPP Computing AS, Oslo (NO)

(72) Inventors: Shlomo Touboul, Kefar Haim (IL); Mark Kaplan, Modiin (IL)

(73) Assignee: CUPP Computing AS, Oslo (NO)

( * ) Notice: Subject to any disclaimer, the term of this patent is extended or adjusted under 35 U.S.C. 154(b) by 622 days.

(21) Appl. No.: 14/326,387

(22) Filed: Jul. 8, 2014

(65) Prior Publication Data
US 2015/0012383 A1  Jan. 8, 2015

Related U.S. Application Data

(60) Provisional application No. 61/843,578, filed on Jul. 8, 2013.

(51) Int. Cl.
*G06Q 30/06* (2012.01)
*H04W 12/08* (2021.01)
*H04W 12/37* (2021.01)
*H04W 12/00* (2021.01)

(52) U.S. Cl.
CPC ..... *G06Q 30/0609* (2013.01); *G06Q 2220/10* (2013.01); *H04W 12/00* (2013.01); *H04W 12/08* (2013.01); *H04W 12/37* (2021.01)

(58) Field of Classification Search
CPC .................................................... G06Q 10/40
USPC ........................................................ 705/50–79
See application file for complete search history.

(56) References Cited

U.S. PATENT DOCUMENTS

| H0001944 H | 2/2001 | Cheswick et al. |
|---|---|---|
| 6,286,087 B1 | 9/2001 | Ito et al. |
| 6,466,779 B1 | 10/2002 | Moles et al. |
| 6,725,294 B1 | 4/2004 | Moore et al. |
| 6,772,345 B1 | 8/2004 | Shetty |
| 6,813,682 B2 | 11/2004 | Bress et al. |
| 7,036,143 B1 | 4/2006 | Leung et al. |
| 7,065,644 B2 | 6/2006 | Daniell et al. |

(Continued)

FOREIGN PATENT DOCUMENTS

| WO | 2000078008 | 12/2000 |
|---|---|---|
| WO | 2004030308 | 4/2004 |

(Continued)

OTHER PUBLICATIONS

NPL "The Online User Supervision Architecture", IEEE Security & Privacy, Nov./Dec. 2011; downloaded from https://ieeexplore.ieee.org/stamp/stamp.jsp?tp=&arnumber=5959149, PDF file attached. (Year: 2011).*

(Continued)

*Primary Examiner* — James D Nigh
*Assistant Examiner* — Margaret M Neubig
(74) *Attorney, Agent, or Firm* — Sheppard, Mullin, Richter & Hampton LLP

(57) ABSTRACT

A digital content marketplace filter engine may be configured to identify a communication between a digital content marketplace client and a digital content marketplace server. An analysis engine may be configured to review the communication against a digital content marketplace policy. A response engine configured to block, allow or modify the communication to conform to the digital content marketplace policy.

14 Claims, 13 Drawing Sheets

(56) References Cited

U.S. PATENT DOCUMENTS

| | | |
|---|---|---|
| 7,069,330 B1 | 6/2006 | McArdle et al. |
| 7,076,690 B1 | 7/2006 | Todd et al. |
| 7,086,089 B2 | 8/2006 | Hrastar et al. |
| 7,131,141 B1 | 10/2006 | Blewett et al. |
| 7,168,089 B2 | 1/2007 | Nguyen |
| D537,036 S | 2/2007 | Chen |
| 7,184,554 B2 | 2/2007 | Freese |
| 7,197,638 B1 | 3/2007 | Grawrock et al. |
| 7,283,542 B2 | 10/2007 | Mitchell |
| 7,353,533 B2 | 4/2008 | Wright et al. |
| 7,359,983 B1 | 4/2008 | Maufer et al. |
| 7,360,242 B2 | 4/2008 | Syvanne |
| 7,418,253 B2 | 8/2008 | Kavanagh |
| 7,529,932 B1 | 5/2009 | Haustein |
| 7,539,828 B2 | 5/2009 | Lomnes |
| 7,657,941 B1 | 2/2010 | Zaitsev |
| 7,665,137 B1 | 2/2010 | Barton |
| 7,818,803 B2 | 10/2010 | Gordon |
| 7,908,476 B2 | 3/2011 | Kandasamy et al. |
| 7,971,258 B1 | 6/2011 | Liao et al. |
| 7,984,479 B2 | 7/2011 | Brabson et al. |
| 7,992,199 B1 | 8/2011 | Winick et al. |
| 8,180,654 B2 | 5/2012 | Berkman et al. |
| 8,218,449 B2 | 7/2012 | Taylor |
| 8,218,558 B2 | 7/2012 | Tan et al. |
| 8,234,261 B2 * | 7/2012 | Monahan ............... G06F 16/435 707/705 |
| 8,239,531 B1 | 8/2012 | Bellovin et al. |
| 8,266,670 B1 | 9/2012 | Merkow |
| 8,321,934 B1 | 11/2012 | Cooley et al. |
| 8,402,528 B1 | 3/2013 | McCorkendale et al. |
| 8,495,290 B2 | 7/2013 | Sugar et al. |
| 8,495,700 B2 | 7/2013 | Shahbazi |
| 8,631,488 B2 | 1/2014 | Oz |
| RE45,009 E | 7/2014 | Vange et al. |
| 8,904,523 B2 | 12/2014 | Gordon |
| 8,978,132 B2 | 3/2015 | Henry |
| 9,202,070 B2 * | 12/2015 | Rajakarunanayake ..................... H04W 12/08 |
| 9,438,631 B2 | 9/2016 | Bettini |
| 9,565,202 B1 | 2/2017 | Kindlund |
| 9,832,603 B2 | 11/2017 | Schlaupitz |
| 9,847,020 B2 | 12/2017 | Davis |
| 9,910,979 B2 | 3/2018 | Ben-Haim |
| 2001/0014102 A1 | 8/2001 | Mattingly |
| 2002/0095540 A1 | 7/2002 | Zolnowsky |
| 2002/0111824 A1 | 8/2002 | Grainger |
| 2002/0193015 A1 | 12/2002 | Milan |
| 2003/0046397 A1 | 3/2003 | Trace et al. |
| 2003/0055994 A1 | 3/2003 | Herrmann et al. |
| 2003/0070084 A1 | 4/2003 | Satomaa et al. |
| 2003/0084319 A1 | 5/2003 | Tarquini et al. |
| 2003/0097431 A1 | 5/2003 | Dill |
| 2003/0110391 A1 | 6/2003 | Wolff et al. |
| 2003/0126468 A1 | 7/2003 | Markham |
| 2003/0131245 A1 | 7/2003 | Linderman |
| 2003/0142683 A1 | 7/2003 | Lam et al. |
| 2003/0148656 A1 | 8/2003 | Huang |
| 2003/0224758 A1 | 12/2003 | O'Neill et al. |
| 2003/0229808 A1 | 12/2003 | Heintz et al. |
| 2004/0003262 A1 | 1/2004 | England et al. |
| 2004/0019656 A1 * | 1/2004 | Smith ................. H04L 63/0227 709/217 |
| 2004/0064575 A1 | 4/2004 | Rasheed et al. |
| 2004/0078568 A1 | 4/2004 | Pham et al. |
| 2004/0085944 A1 | 5/2004 | Boehm |
| 2004/0093520 A1 | 5/2004 | Lee et al. |
| 2004/0123153 A1 | 6/2004 | Wright et al. |
| 2004/0148450 A1 | 7/2004 | Chen et al. |
| 2004/0177274 A1 | 9/2004 | Aroya |
| 2004/0199763 A1 | 10/2004 | Freund |
| 2004/0203296 A1 | 10/2004 | Moreton et al. |
| 2004/0210775 A1 | 10/2004 | Gbadegesin |
| 2004/0237079 A1 | 11/2004 | Cox et al. |
| 2005/0055578 A1 | 3/2005 | Wright |
| 2005/0091522 A1 | 4/2005 | Hearn et al. |
| 2005/0109841 A1 | 5/2005 | Ryan |
| 2005/0114711 A1 | 5/2005 | Hesselink et al. |
| 2005/0114870 A1 | 5/2005 | Song |
| 2005/0149757 A1 | 7/2005 | Corbett et al. |
| 2005/0182883 A1 | 8/2005 | Overtoom |
| 2005/0208967 A1 | 9/2005 | Buniatyan |
| 2005/0254455 A1 | 11/2005 | Plehn et al. |
| 2005/0260996 A1 | 11/2005 | Groenendaal |
| 2005/0265385 A1 | 12/2005 | Cromer |
| 2005/0278544 A1 | 12/2005 | Baxter |
| 2006/0020723 A1 | 1/2006 | Chia-Chun |
| 2006/0022802 A1 | 2/2006 | Bridgelall |
| 2006/0031940 A1 | 2/2006 | Rozman et al. |
| 2006/0037071 A1 | 2/2006 | Rao et al. |
| 2006/0056317 A1 | 3/2006 | Manning et al. |
| 2006/0059092 A1 | 3/2006 | Burshan et al. |
| 2006/0064391 A1 | 3/2006 | Petrov et al. |
| 2006/0070129 A1 | 3/2006 | Sobel et al. |
| 2006/0074896 A1 | 4/2006 | Thomas et al. |
| 2006/0075494 A1 | 4/2006 | Bertman et al. |
| 2006/0075501 A1 | 4/2006 | Thomas et al. |
| 2006/0085528 A1 | 4/2006 | Thomas |
| 2006/0095595 A1 | 5/2006 | Dalton et al. |
| 2006/0101277 A1 | 5/2006 | Meenan et al. |
| 2006/0161985 A1 | 7/2006 | Zhao |
| 2006/0174342 A1 | 8/2006 | Zaheer |
| 2006/0206300 A1 | 9/2006 | Garg et al. |
| 2006/0224794 A1 | 10/2006 | Stevens |
| 2006/0229741 A1 | 10/2006 | Achanta |
| 2006/0230199 A1 | 10/2006 | Yu |
| 2006/0242686 A1 | 10/2006 | Toda et al. |
| 2006/0272020 A1 | 11/2006 | Gardner |
| 2006/0277405 A1 | 12/2006 | Bowler et al. |
| 2007/0005987 A1 | 1/2007 | Durham et al. |
| 2007/0022474 A1 | 1/2007 | Rowett et al. |
| 2007/0058642 A1 | 3/2007 | Eisink |
| 2007/0061887 A1 | 3/2007 | Hoover et al. |
| 2007/0083939 A1 | 4/2007 | Fruhauf et al. |
| 2007/0097976 A1 | 5/2007 | Wood et al. |
| 2007/0104197 A1 | 5/2007 | King |
| 2007/0110053 A1 | 5/2007 | Soni et al. |
| 2007/0118874 A1 | 5/2007 | Adams et al. |
| 2007/0118893 A1 | 5/2007 | Crawford |
| 2007/0123214 A1 | 5/2007 | Mock |
| 2007/0124536 A1 | 5/2007 | Carper |
| 2007/0130433 A1 | 6/2007 | Safa |
| 2007/0130457 A1 | 6/2007 | Kamat et al. |
| 2007/0143827 A1 | 6/2007 | Nicodemus et al. |
| 2007/0143851 A1 | 6/2007 | Nicodemus et al. |
| 2007/0162582 A1 | 7/2007 | Belali et al. |
| 2007/0192500 A1 | 8/2007 | Lum |
| 2007/0192854 A1 | 8/2007 | Kelley et al. |
| 2007/0199060 A1 | 8/2007 | Touboul |
| 2007/0199061 A1 | 8/2007 | Byres et al. |
| 2007/0209067 A1 | 9/2007 | Fogel |
| 2007/0214369 A1 | 9/2007 | Roberts et al. |
| 2007/0220187 A1 | 9/2007 | Kates |
| 2007/0233842 A1 | 10/2007 | Roberts |
| 2007/0240217 A1 | 10/2007 | Tuvell et al. |
| 2007/0261112 A1 | 11/2007 | Todd et al. |
| 2007/0266265 A1 | 11/2007 | Zmudzinski |
| 2007/0281664 A1 | 12/2007 | Kaneko et al. |
| 2007/0294744 A1 | 12/2007 | Alessio et al. |
| 2008/0034419 A1 | 2/2008 | Mullick et al. |
| 2008/0066148 A1 | 3/2008 | Lim |
| 2008/0083030 A1 | 4/2008 | Durham et al. |
| 2008/0083037 A1 | 4/2008 | Kruse et al. |
| 2008/0084799 A1 | 4/2008 | Repasi |
| 2008/0098478 A1 | 4/2008 | Vaidya et al. |
| 2008/0109871 A1 | 5/2008 | Jacobs |
| 2008/0114990 A1 | 5/2008 | Hilbert et al. |
| 2008/0120423 A1 | 5/2008 | Hall et al. |
| 2008/0134163 A1 | 6/2008 | Golde |
| 2008/0141349 A1 | 6/2008 | Lyle et al. |
| 2008/0165957 A1 | 7/2008 | Kandasamy et al. |
| 2008/0201264 A1 | 8/2008 | Brown |
| 2008/0235755 A1 | 9/2008 | Blaisdell et al. |
| 2008/0282337 A1 | 11/2008 | Crawford |

(56) References Cited

U.S. PATENT DOCUMENTS

| | | | |
|---|---|---|---|
| 2008/0307240 | A1 | 12/2008 | Dahan et al. |
| 2009/0019223 | A1 | 1/2009 | Lection et al. |
| 2009/0054075 | A1 | 2/2009 | Boejer |
| 2009/0106556 | A1 | 4/2009 | Hamid |
| 2009/0135751 | A1 | 5/2009 | Hodges et al. |
| 2009/0143057 | A1 | 6/2009 | Arun et al. |
| 2009/0165132 | A1 | 6/2009 | Jain et al. |
| 2009/0249465 | A1 | 10/2009 | Touboul |
| 2009/0253454 | A1 | 10/2009 | Sampson |
| 2009/0254993 | A1 | 10/2009 | Leone |
| 2010/0064341 | A1 | 3/2010 | Aldera et al. |
| 2010/0186093 | A1 | 7/2010 | Aussel |
| 2010/0195833 | A1 | 8/2010 | Preistley et al. |
| 2010/0218012 | A1 | 8/2010 | Joseph |
| 2010/0225493 | A1 | 9/2010 | Zishaan |
| 2010/0242109 | A1 | 9/2010 | Lee |
| 2010/0251369 | A1 | 9/2010 | Grant |
| 2010/0269172 | A1 | 10/2010 | Xie |
| 2010/0333088 | A1 | 12/2010 | Rogel et al. |
| 2011/0023118 | A1 | 1/2011 | Wright |
| 2011/0154443 | A1 | 6/2011 | Thakur et al. |
| 2011/0154477 | A1 | 6/2011 | Parla et al. |
| 2011/0182180 | A1 | 7/2011 | Riddle |
| 2011/0264931 | A1 | 10/2011 | Chang et al. |
| 2011/0268106 | A1 | 11/2011 | Dalton, Jr. et al. |
| 2011/0269397 | A1 | 11/2011 | Bella |
| 2011/0296397 | A1 | 12/2011 | Vidal et al. |
| 2012/0005756 | A1 | 1/2012 | Hoefelmeyer et al. |
| 2012/0030750 | A1 | 2/2012 | Bhargava et al. |
| 2012/0042391 | A1* | 2/2012 | Risan .......... H04N 21/4755 726/28 |
| 2012/0054744 | A1 | 3/2012 | Singh et al. |
| 2012/0084831 | A1 | 4/2012 | Hu et al. |
| 2012/0110320 | A1 | 5/2012 | Kumar et al. |
| 2012/0110331 | A1 | 5/2012 | Falk |
| 2012/0149350 | A1 | 6/2012 | Fan et al. |
| 2012/0173609 | A1 | 7/2012 | Kulaga et al. |
| 2012/0185846 | A1 | 7/2012 | Recio et al. |
| 2012/0216273 | A1 | 8/2012 | Rolette et al. |
| 2012/0233695 | A1 | 9/2012 | Mahaffey et al. |
| 2012/0239739 | A1 | 9/2012 | Manglik et al. |
| 2012/0240183 | A1* | 9/2012 | Sinha .......... H04L 63/1425 726/1 |
| 2012/0240236 | A1 | 9/2012 | Wyatt et al. |
| 2012/0303971 | A1 | 11/2012 | Palka |
| 2012/0324504 | A1* | 12/2012 | Archer .......... H04N 21/4751 725/30 |
| 2013/0031601 | A1* | 1/2013 | Bott .......... G06F 21/552 726/1 |
| 2013/0064373 | A1 | 3/2013 | Hagbard |
| 2013/0074144 | A1 | 3/2013 | Narayanaswamy et al. |
| 2013/0091534 | A1 | 4/2013 | Gilde et al. |
| 2013/0097659 | A1* | 4/2013 | Das .......... H04L 63/1433 726/1 |
| 2013/0097660 | A1* | 4/2013 | Das .......... H04W 12/08 726/1 |
| 2014/0032314 | A1* | 1/2014 | Gieseke .......... G06Q 30/02 705/14.49 |
| 2014/0058679 | A1 | 2/2014 | Varoglu |
| 2014/0317679 | A1 | 10/2014 | Wade |
| 2016/0105847 | A1 | 4/2016 | Smith |
| 2016/0234204 | A1 | 8/2016 | Rishi |
| 2017/0039367 | A1 | 2/2017 | Ionescu |
| 2017/0103647 | A1 | 4/2017 | Davis |

FOREIGN PATENT DOCUMENTS

| | | |
|---|---|---|
| WO | 2006069041 | 6/2006 |
| WO | 2007110094 | 10/2007 |
| WO | 2008154726 | 12/2008 |
| WO | 2009004452 | 1/2009 |
| WO | 2010004296 | 1/2010 |

OTHER PUBLICATIONS

NPL—"Method and system to provide automatic parental control in television broadcasting environment", downloaded through IP.com and attached as PDF file (Year: 2012).*

International Application No. PCT/US2014/045826, International Search Report and Written Opinion dated Oct. 30, 2014.

European Patent Application No. 13845746.0, Search Report dated Jun. 7, 2016.

European Patent Application No. 06821641.5, Examination Report dated Dec. 16, 2016.

International Application No. PCT/US2015/015970, International Search Report and Written Opinion dated May 28, 2015.

Breeden II, John et al., "A Hardware Firewall You Take With You," Government Computer News, located at http:/gcn.com/Articles/2005/06/01/A-hardware-firewall-you-take-with-you.aspx?p=1, Jun. 1, 2005.

Claessens, Joris et al., "(How) Can Mobile Agents Do Secure Electronic Transactions on Mobile Hosts? A Survey of the Security Issues and the Current Solutions," ACM Transactions on Intenet Technology, vol. 3, No. 1, pp. 28-48, Feb. 2003.

CyberGuard Corporation, "Model 1: Wireless Mobile Security Appliance," located at http://support2.cyberguard.com/products/oem/model1.htm, 2005.

Entry, Inc., "CyberGuard Develops a Custom Mobile Security Appliance," SecurityProNews, located at http://www.securitypronews.com/news/securitynews/spn-45-20041007CyberGuardDevelo . . . , Oct. 7, 2004.

Kent, S. et al., "Security Architecture for the Internet Protocol," I.E.T.F. Network Working Group, RFC 4301, pp. 10-11, Dec. 2005.

PMC-Sierra, Inc., "MSP8120 Multi-Service Security Processor," Product Brief, 2007.

Prevelakis, Vassilis et al., "Drop-In Security for Distributed and Portable Computing Elements," Internet Research: Electronic Networking, Applications and Policy, vol. 13, No. 2, pp. 107-115, located at http://www.cs.columbia.edu/~angelos/Papers/InternetResearch-Final.pdf, 2003.

WatchGuard Technologies, Inc., "Mobile User VPN and PPTP," Internet Security Handbook, copyright 1998-2001, pp. 1-2, located at http://www.watchguard.com/help/Iss/41 /handbook/vpn3.htm, believe published Jun. 5, 2003.

ZyXEL Communications Corp., "ZyXEL Releases Worlds First Palm-Sized Portable Personal Firewall for Ultimate Security: ZyWALL P1 Pushes Network Security to the End-Point PC's with Minimum Administration Effort," ZyXEL News, located at http://global.zyxel.com/news/press.php?indexflag=20050310013432, Mar. 8, 2005.

European Patent Application No. 06821641.5, Search Report dated May 17, 2011.

European Patent Application No. 08847968.8, Search Report dated Oct. 25, 2011.

International Application No. PCT/IL2006/001428, International Search Report and Written Opinion dated Jul. 15, 2008.

International Application No. PCT/IL2008/000740, International Search Report and Written Opinion dated Nov. 5, 2008.

International Application No. PCT/US2008/055942, International Search Report and Written Opinion dated Apr. 6, 2009.

International Application No. PCT/US2009/065204, International Search Report and Written Opinion dated Jan. 13, 2010.

International Application No. PCT/US2013/064161, International Search Report and Written Opinion dated Apr. 18, 2014.

Hall, Marty, "Core Web Programming: Chapter 16—The Hypertext Transfer Protocol," Prentice Hall PTR, ISBN 0-13-625666-X, pp. 867-911, Dec. 1997.

Henmi, Anne et al., "Firewall Policies and VPN Configurations," Syngress Publishing, Inc., ISBN 1-59749-088-1, pp. 99, 111, 291, Dec. 2006.

Jakobsson, Markus, "Invasive Browser Sniffing and Countermeasures," Proceedings of the 15th International Conference on World Wide Web, pp. 523-532, May 23, 2006.

Lee, Henry C.J. et al., "Port Hopping for Resilient Networks," IEEE 60th Vehicular Technology Conference (VTC2004), Sep. 26, 2004.

(56) References Cited

OTHER PUBLICATIONS

O'Brien, Kevin J., "Microsoft Hit by Antitrust Complaint for Browser," The International Herald Tribune, Dec. 14, 2007.
Sen, Subhabrata et al., "Accurate, Scalable In-Network, Identification of P2P Traffic Using Application Signatures," Proceedings of the 13th International Conference on World Wide Web, pp. 512-521, May 17, 2004.
Shreeve, Jimmy Lee, "Hasta la Vista, Microsoft!; It's Faster than Windows, It Fights Viruses—and It's Free," Independent Extra, Aug. 29, 2007.
Shuler, Rus, "How Does the Internet Work," white paper, 2002 [retrieved online at https://web.stanford.edu/class/msande91si/www-spr04/readings/week1/InternetWhitepaper.htm on Dec. 11, 2018.
Srisuresh, P. et al., "IP Network Address Translator (NAT) Terminology and Considerations," I.E.T.F. Network Working Group, RFC 2663, Aug. 1999.
Srisuresh, P. et al., "Traditional IP Network Address Translator (Traditional NAT)," I.E.T.F. Network Working Group, RFC 3022, Jan. 2001.
Fielding, R. et al., "Hypertext Transfer Protocol—HTTP/1.1," I.E.T.F. Network Working Group, RFC 2616, Jun. 1999.
Hall, Marty, "More Servlets and JavaServer Pages: Chapter 2—A Fast Introduction to Basic Servlet Programming," Prentice Hall PTR, ISBN 0-13-067614-4, pp. 34-118, Dec. 1997.
World Wide Web Consortium (W3C), "HTTP Request Fields," May 3, 1994 [retrieved online at https://web.archive.org/web/20060110150527/http://www.w3.org:80/Protocols/HTTP/HTRQ_Headers.html on Jan. 24, 2019].
Decision—Institution of Inter Partes Review of U.S. Pat. No. 9,781,164 entered Jun. 25, 2019, 28 pages.
Decision—Institution of Inter Partes Review of U.S. Pat. No. 8,631,488 entered Aug. 28, 2019, 39 pages.
Decision—Institution of Inter Partes Review of U.S. Pat. No. 9,106,683 entered Aug. 28, 2019, 39 pages.
Decision—Institution of Inter Partes Review of U.S. Pat. No. 9,843,595 entered Aug. 28, 2019, 33 pages.
Decision—Institution of Inter Partes Review of U.S. Pat. No. 8,365,272 entered Jul. 26, 2019, 27 pages.
Decision—Institution of Inter Partes Review of U.S. Pat. No. 9,756,079 entered Jul. 26, 2019, 32 pages.
Decision—Institution of Inter Partes Review of U.S. Pat. No. 8,789,202 entered Sep. 18, 2019, 33 pages.
Liang et al., "Passive Wake-up Scheme for Wireless Sensor Networks", Second International Conference on Innovative Computing, Information and Control, 2007, 4 pages.
Lim et al., "Adaptive power controllable retrodirective array system for wireless sensor server applications", IEEE Transactions on Microwave Theory and Techniques, vol. 53, No. 12, Dec. 2005, pp. 3735-3743.
*Trend Micro Inc.* v. *CUPP Computing AS*, IPR2019-00765, U.S. Pat. No. 9,843,595, Judgment Final Written Decision Determining All Challenged Claims Unpatentable entered Aug. 25, 2020, 47 pages.
*Trend Micro Inc.* v. *CUPP Computing AS*, IPR2019-00803, U.S. Pat. No. 8,789,202, Judgment Final Written Decision Determining No Challenged Claims Unpatentable entered Sep. 15, 2020, 30 pages.
*CUPP Cybersecurity, LLC and CUPP Computing AS* v. *Trend Micro, Inc., Trend Micro America, Inc., and Trend Micro Incorporated*, Case No. 3:20-cv-03206-K, Complaint for Patent Infringement, filed Oct. 20, 2020, 99 pages.
*CUPP Cybersecurity, LLC and CUPP Computing AS* v. *Trend Micro, Inc., Trend Micro America, Inc., and Trend Micro Incorporated*, Case No. 20-cv-03206-M, First Amended Complaint for Patent Infringement, filed Apr. 23, 2021, 140 pages.

* cited by examiner

Marketplace Security System 165 

| Marketplace Data Redirector Interface Engine 205 |
|---|
| Digital Content Marketplace Filter Engine 210 |
| Search Request Security Analysis Engine 215 |
| Security Policy Interface Engine 220 |
| Search Request Response Engine 225 |
| Search Results Security Analysis Engine 230 |
| Search Results Response Engine 235 |
| Digital Content Security Analysis Engine 240 |
| Digital Content Security Response Engine 245 |
| Digital Content Marketplace Client Interface Engine 250 |

FIGURE 2

Marketplace Security
Policies
170

| Search Request Security Policy 605 |
| Search Results Security Policy 610 |
| Digital Content Attribute Verification Policy 615 |
| Digital Content Malware Analysis Security Policy 620 |
| Content Analysis Policy 625 |
| Digital Rights Management Policy 630 |

US 11,157,976 B2

SYSTEMS AND METHODS FOR PROVIDING DIGITAL CONTENT MARKETPLACE SECURITY

PRIORITY CLAIM

This application claims priority to U.S. Provisional Patent Application Ser. No. 61/843,578, filed Jul. 8, 2013, and entitled "Systems and Methods to Control, Manage and Define/Enforce Policy to Application Marketplace and a Mobile Device," the contents of which are hereby incorporated by reference herein.

TECHNICAL FIELD

The technical field relates to computer security systems and methods. More specifically, the technical field relates to systems and methods for providing security for a digital content marketplace.

BACKGROUND

Digital content marketplaces provide convenient distribution platforms for digital content. In many digital content marketplaces, a digital content marketplace client on an end user's device typically allows digital content to be downloaded and initially accessed by the device. Many mobile and traditional operating systems include or are affiliated with some form of digital content marketplace.

However, many digital content marketplaces face security issues, since many do not closely monitor publishers or digital content. These digital content marketplaces leave users vulnerable to digital content that contains malicious code. As a result, most digital content marketplaces provide little control for end users or Information Technology (IT) departments to further manage access. It would be helpful if systems and methods existed that could secure digital content marketplaces to protect end users from malicious code and allow end users and IT departments greater control.

SUMMARY

In a system, a digital content marketplace filter engine may be configured to identify a communication between a digital content marketplace client and a digital content marketplace server. An analysis engine may be configured to review the communication against a digital content marketplace policy. A response engine configured to block, allow or modify the communication to conform to the digital content marketplace policy.

In some embodiments, the communication comprises a search request for one or more digital content items. The communication may include search results in response to a search request for digital content items.

In an embodiment, the digital content marketplace policy may include a whitelist or a blacklist of digital content items. The digital content marketplace policy may include at least one attribute associated with each digital content item. The at least one attribute may include title, publisher, size, hardware requirements, metadata or tags. Moreover, the digital content marketplace policy may include at least one budget factor. Further, the at least one budget factor may include a maximum price per digital content item, a maximum budget per time period, or a maximum number of downloads per time period.

In various embodiments, the digital content marketplace policy includes at least one metric associated with each digital content item. The at least one metric includes number of downloads, user rating, or popularity.

In a method, communication between a digital content marketplace client and a digital content marketplace server may be identified. The communication may be reviewed against a digital content marketplace policy. The communication may be blocked, allowed, or modified to conform to the digital content marketplace policy.

In some embodiments, the communication comprises a search request for one or more digital content items. The communication may include search results in response to a search request for digital content items.

In an embodiment, the digital content marketplace policy may include a whitelist or a blacklist of digital content items. The digital content marketplace policy may include at least one attribute associated with each digital content item. The at least one attribute may include title, publisher, size, hardware requirements, metadata or tags. Moreover, the digital content marketplace policy may include at least one budget factor. Further, the at least one budget factor may include a maximum price per digital content item, a maximum budget per time period, or a maximum number of downloads per time period.

In various embodiments, the digital content marketplace policy includes at least one metric associated with each digital content item. The at least one metric includes number of downloads, user rating, or popularity.

A system may include: means for identifying a communication between a digital content marketplace client and a digital content marketplace server; means for reviewing the communication against a digital content marketplace policy; and means for blocking, allowing or modifying the communication to conform to the digital content marketplace policy.

Other features and embodiments are apparent from the accompanying drawings and from the detailed description.

BRIEF DESCRIPTION OF THE DRAWINGS

FIG. 2 depicts an example marketplace security system, according to some embodiments.

DETAILED DESCRIPTION

Figure 1A:
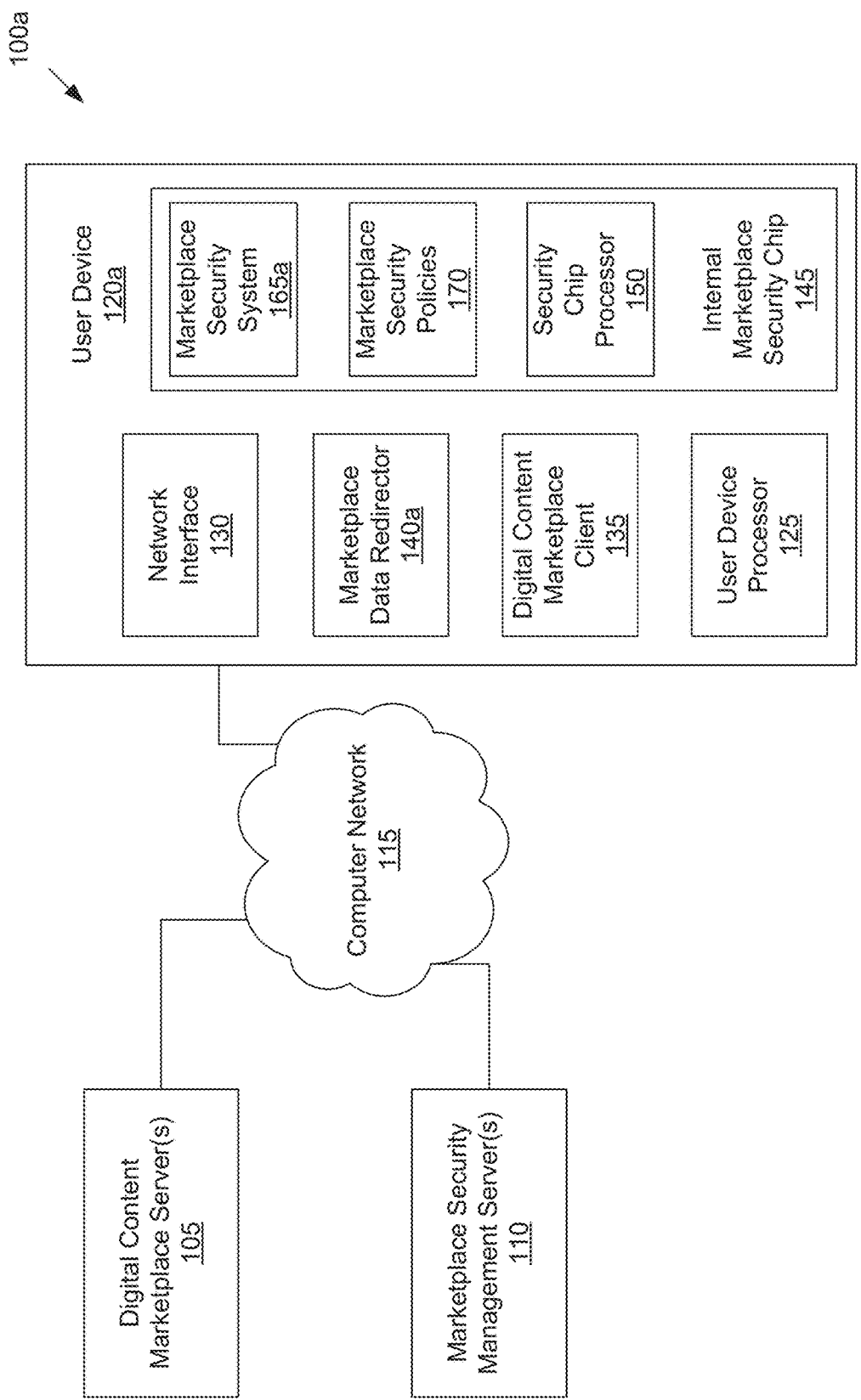
FIG. 1A depicts an example digital content marketplace security environment, according to some embodiments.

FIG. 1A depicts an example digital content marketplace security environment 100a, according to some embodiments. The digital content marketplace security environment 100a may include a digital content marketplace server 105, a marketplace security management server 110, a computer network 115, and a user device 120a. As will be discussed herein, the digital content marketplace security environment 100a uses the marketplace security system 165a and the marketplace security policies 170 to provide security for communications between the user device 120a and the digital content marketplace server 105.

The digital content marketplace server(s) 105 may include a digital device configured to distribute digital content to the user device 120a. "Digital content," as referred to herein, may refer to any item of content that can be represented in a format compatible with a digital device. Examples of digital content include digital applications compatible with digital devices, digital books, digital music, and digital video. In some embodiments, the digital content marketplace server(s) 105 allows digital content publishers to publish digital content. Digital content publishers may include publishers affiliated with the entity that manages the digital content marketplace server(s) 105 as well as third-party publishers who are not affiliated with the entity that manages the digital content marketplace server(s) 105. The digital content marketplace server(s) 105 may allow users to access published digital content. For example, the digital content marketplace server(s) 105 may allow users to download, install, and/or stream digital applications, digital books, digital music, and digital video.

The digital content marketplace server(s) 105 may store and/or index digital content and may allow users to perform searches and take other actions with respect to digital content. More particularly, the digital content marketplace server(s) 105 may allow users to search for digital content that has been published. In some embodiments, the digital content marketplace server(s) 105 provides categories of digital content for users to browse. The digital content marketplace server(s) 105 may also provide metrics about digital content, such as sizes of digital content, resources consumed by digital content, ratings, downloads and other metrics about the digital content.

The digital content marketplace server(s) 105 may be associated with a specific operating platform of the user device 120, such a specific operating system of the user device 120. For example, the digital content marketplace server(s) 105 may be associated with a mobile operating system such as the iOS operating system, the Android operating system, and the Windows Phone operating system. The digital content marketplace server(s) 105 may also be associated with a Mac-based operating system, a Linux-based operating system, or a Windows-based operating system. The digital content marketplace server(s) 105 may be a server corresponding to the iOS App Store, the Mac App Store, the iTunes Store, the Kindle Store, the Google Play Store, the Windows Phone Store, or the Windows Store. In some embodiments, the digital content marketplace server(s) 105 need not be affiliated with an operating platform of the user device 120. For example, the digital content marketplace server(s) 105 may be maintained by a vendor of digital content (such as Amazon or Netflix) that distributes digital content but does not maintain an operating platform for the user device 120.

The marketplace security management server(s) 110 may include a digital device configured to manage the marketplace security system 165a and/or the marketplace security policies 170. The marketplace security management server(s) 110 may install the marketplace security system 165a and/or the marketplace security policies 170. The marketplace security management server(s) 110 may also maintain a master list of security policies with the latest security policy definitions. The master list of security policies may be used to update the marketplace security policies 170. In some embodiments, the marketplace security management server(s) 110 is managed by an entity that provides Information Technology (IT) services. Examples of such an entity include a member of the IT department of an enterprise, a parent of a user of the user device 120a, and an entity maintaining the security of the computer network 115. The entity providing the IT services corresponds to the entity managing the digital content marketplace server(s) 105 in an embodiment. Although FIG. 1A depicts the marketplace security management server(s) 110 as residing on a different device than the user device 120a, this depiction is by way of illustration only. In some embodiments, the marketplace security management server(s) 110 resides on the application marketplace server(s) 105, user device 120a, or some other known or convenient digital device. In specific implementations, the marketplace security management server(s) 110 include a standalone application, a set of Application Programming Interfaces (APIs), or a web portal.

The computer network 115 may include a medium that couples digital devices to one another. The computer network 115 may include technologies such as Ethernet, 802.11x, worldwide interoperability for microwave access WiMAX, 2G, 3G, 4G, CDMA, GSM, LTE, digital subscriber line (DSL), and/or the like. The computer network 115 may further include networking protocols such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or the like. The data exchanged over the computer network 115 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec). Though element 115 is labeled a "computer network" in FIG. 1, it is noted that in various embodiments, the element 115 may refer to any medium that facilitates digital devices to other digital devices, or components of digital devices to other components of digital devices. In various embodiments, the element 115 may refer to a bus, cable, or other device used to couple components of a digital device to one another.

The user device 120a may include a digital device that allows a user to interact with digital content published by the digital content marketplace server(s) 105. The user device 120a may include a mobile phone, a Personal Data Assistant (PDA), a tablet computing device, a laptop computer, a desktop computer, or some combination thereof. The user device 120a may include a user device processor 125, a network interface 130, a digital content marketplace client 135, a marketplace data redirector(s) 140a, and an internal marketplace security chip 145.

The user device processor 125 may include a shared or dedicated processor configured to execute instructions loaded in a memory of the user device 120a. The user device processor 125 may include a general purpose processor that executes an operating system, processes, and applications loaded into the memory of the user device 120a. The user device processor 125 may provide instructions to execute the network interface 130, the digital content marketplace client 135, and the marketplace data redirector(s) 140a.

The network interface 130 may include hardware, firmware, and/or software configured to receive data from the computer network 115 and provide data to the computer network 115. The network interface 130 may be compatible with the transmission protocols of the computer network 115 and other portions of the user device 120a.

The digital content marketplace client 135 may include hardware, firmware, and/or software configured to provide access to the digital content marketplace server(s) 105. In an embodiment, the digital content marketplace client 135 provides facilitates search for digital content on the digital content marketplace server(s) 105. The digital content marketplace client 135 may also receive search results of digital content on the digital content marketplace server(s) 105. The digital content marketplace client 135 may further provide the ability to view categories of digital content and metrics associated with digital content.

The digital content marketplace client 135 may facilitate installation and/or access of digital content on the user device 120a. For example, the digital content marketplace client 135 may download and initiate installation of applications from the digital content marketplace server(s) 105. As another example, the digital content marketplace client 135 may download or initiate streaming digital books, digital music, or digital video that the user device 120a has been authorized to access. The digital content marketplace client 135 may also facilitate installation of processes and/or applications (digital book readers, digital music or digital video players, etc.) that are required to access the digital content items. Examples of the digital content marketplace client 135 include portions of the iOS App Store client application, the Mac App Store client application, the iTunes client application, the Kindle Reader, the Google Play client application, the Windows Phone Store client application, and the Windows Store client application.

The marketplace data redirector(s) 140a may include hardware, firmware, and/or software to redirect the data going to and coming from the digital content marketplace client 135 to the internal marketplace security chip 145. In some embodiments, the marketplace data redirector(s) 140a identifies marketplace communications (Hypertext Transfer Protocol (HTTP) communications, API calls, Wi-Fi communications, Ethernet communications, Bluetooth communications, etc.) to and from the digital content marketplace client 135. The marketplace data redirector(s) 140a may further redirect these marketplace communications to the internal marketplace security chip 145. For instance, the marketplace data redirector(s) 140a may redirect to the internal marketplace security chip 145 all requests to search digital content in the digital content marketplace server(s) 105. As another example, the marketplace data redirector(s) 140a may redirect to the internal marketplace security chip 145 results of the search requests coming from the digital content marketplace server(s) 105. As yet another example, the marketplace data redirector(s) 140a may redirect to the internal marketplace security chip 145 all requests to install, update, and/or modify digital content on the user device 120a. In various embodiments, the marketplace data redirector(s) 140a is implemented using a library of code that is executed by the user device processor 125.

Although FIG. 1A depicts the marketplace data redirector(s) 140a with a single element, it is noted that various embodiments, the marketplace data redirector(s) 140a includes multiple may employ more than one library of code. For example, the marketplace data redirector(s) 140a may include a first marketplace data redirector that processes all data passing between the digital content marketplace client 135 and the digital content marketplace server(s) 105. The first marketplace data redirector may redirect all search requests and search results relating to digital content to the internal marketplace security chip 145. The marketplace data redirector(s) 140a may also include a second marketplace data redirector that processes all data passing between the digital content marketplace client 135 and an installer on the user device 120a. The second marketplace data redirector may redirect requests to install, modify, or update digital content to the internal marketplace security chip 145.

The internal marketplace security chip 145 may include hardware coupled to an internal port or embedded within the user device 120a. In an embodiment, the internal marketplace security chip 145 is implemented as a non-volatile memory card, such as a Secure Digital (SD) card. For example, the internal marketplace security chip 145 may be implemented as a standard SD card, a miniSD card, or a microSD card. The internal marketplace security chip 145 may also be implemented in other known or convenient formats, such as in a SmartMedia (SM) or a Personal Computer Memory Card International Association (PCM-CIA) card. The internal marketplace security chip 145 may include a security chip processor 150, a marketplace security system 165a, and marketplace security policies 170.

The security chip processor 150 may include a shared or dedicated processor configured to execute the processes associated with the internal marketplace security chip 145. The security chip processor 150 may be separate and independent of the user device processor 125 described herein. In an embodiment, the security chip processor 150 is a secure processor. More specifically, the security chip processor 150 may implement encryption and other security algorithms to ensure the contents of the internal marketplace security chip 145 are protected from unauthorized access. The security chip processor 150 may store use secure memory of the internal marketplace security chip 145 for its operations. In an embodiment, the security chip processor 150 may provide instructions to execute the marketplace security system 165a.

The marketplace security system 165a may include hardware, firmware, and/or software to provide security for the data going to and coming from the digital content marketplace client 135. The marketplace security system 165a may be a miniature server, based on commercial hardware (with Intel's Xscale as the core), Linux OS and network services, and an open-source firewall. The marketplace security system 165a may be based on an embedded OS, such as a version of embedded Linux. The marketplace security system 165a may receive the marketplace communications from the marketplace data redirector(s) 140a. The marketplace security system 165a may further evaluate the marketplace communications in accordance with the marketplace security policies 170, as describe herein. Based on the marketplace security policies 170, the marketplace security system 165a may determine whether to allow, deny, or modify the marketplace communications based on the marketplace security policies 170. To continue the foregoing examples, the marketplace security system 165a may determine whether to allow, deny, or modify a particular search request and/or particular search results based on the marketplace security policies 170. The marketplace security system 165a may further determine whether to allow, deny, or modify installation of digital content based on the marketplace security policies 170. In an embodiment, the marketplace security system 165a may be executed by the security chip processor 150, and may be controlled by the marketplace security management server(s) 110. FIG. 2 shows the marketplace security system 165a in greater detail.

Figure 6:
FIG. 6 depicts example security policies, according to some embodiments.

The marketplace security policies 170 may include hardware, firmware, and/or software datastores configured to support the marketplace security system 165a. In an embodiment, the marketplace security policies 170 include policies related to the types of search requests, search results, and digital content that are to be allowed, denied, or modified. For example, the marketplace security policies 170 may include policies related to acceptable and/or unacceptable search requests and acceptable and/or unacceptable search results. The marketplace security policies 170 may also include policies related to acceptable and/or unacceptable digital content types, policies related to malware definitions, and policies that implement content analysis and risk assessment definitions. In various embodiments, the marketplace security policies 170 include policies related to of acceptable and/or unacceptable metrics about digital content. The marketplace security policies 170 may further include policies related to Digital Rights Management (DRM) definitions and/or other information relating to whether digital content is to be allowed, denied, or modified. The marketplace security policies 170 may be controlled and may receive updates from the marketplace security management server(s) 110. FIG. 6 shows the marketplace security policies 170 in greater detail.

Figure 1B:
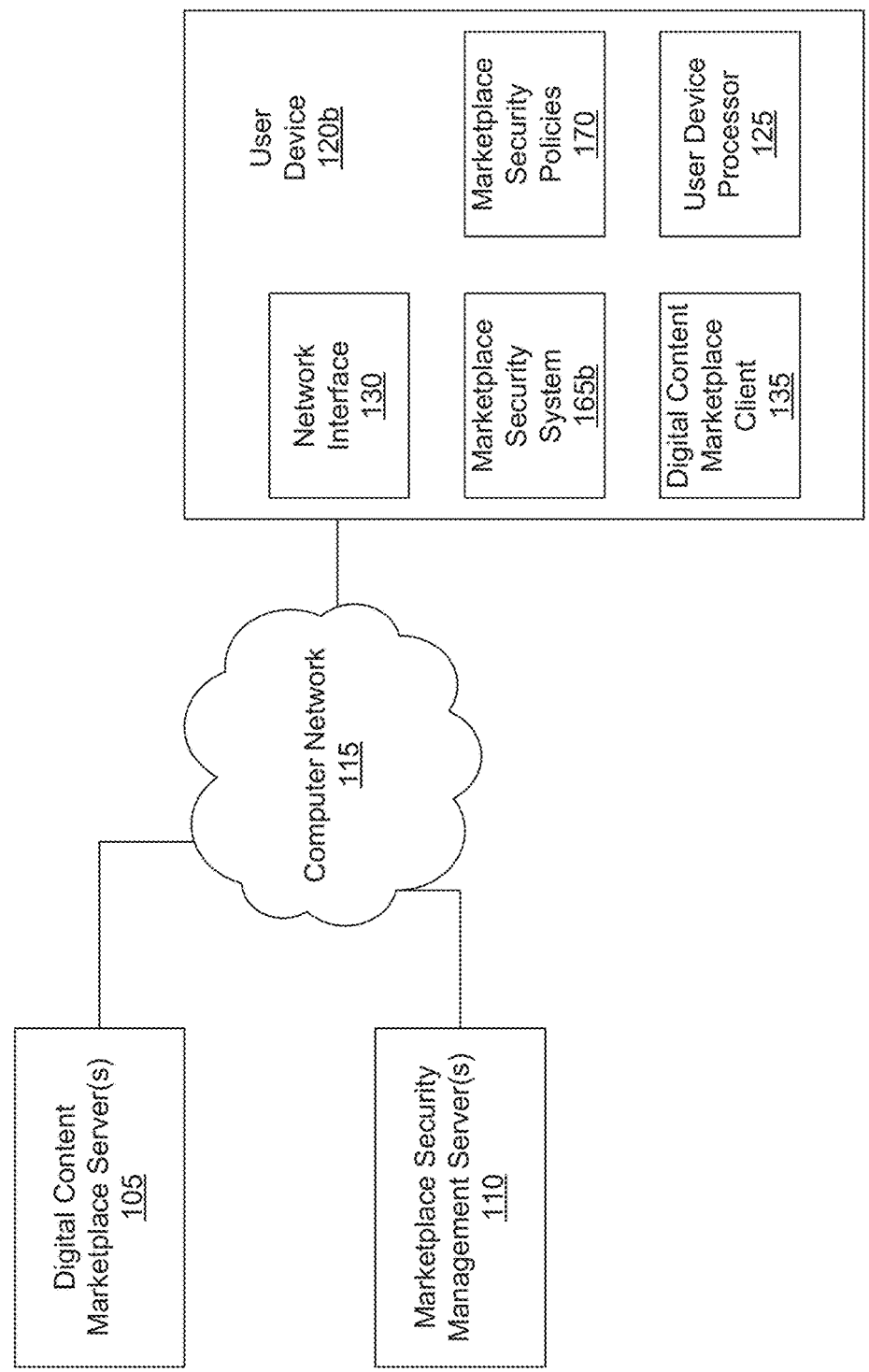
FIG. 1B depicts an example digital content marketplace security environment, according to some embodiments.

FIG. 1B depicts an example digital content marketplace security environment 100b, according to some embodiments. The digital content marketplace security environment 100b includes a digital content marketplace server 105, a marketplace security management server 110, a computer network 115, and a user device 120b. The digital content marketplace server 105, the marketplace security management server 110, and the computer network 115 may be similar to their counterparts in FIG. 1A.

The user device 120b includes a user device processor 125, a network interface 130, a digital content marketplace client 135, a marketplace security system 165, and marketplace security policies 170. The user device processor 125, the network interface 130 and the digital content marketplace client 135 may be similar to their counterparts in FIG. 1A.

In an embodiment, the marketplace security system 165b implements the features of the marketplace data redirector(s) 140a and the marketplace security system 165a, which are discussed in conjunction with FIG. 1A. More specifically, the marketplace security system 165b may include hardware, firmware, and/or software to intercept data going to and coming from the digital content marketplace client 135. The marketplace security system 165b may further include hardware, firmware, and/or software to provide security for the data going to and coming from the digital content marketplace client 135. In various embodiments, the marketplace security system 165b may be executed using the user device processor 125. In an embodiment, the marketplace security policies 170 are stored in memory of the user device 120b. The user device 120b may store the marketplace security policies 170 using portions of memory secured from unauthorized access.

Figure 1C:
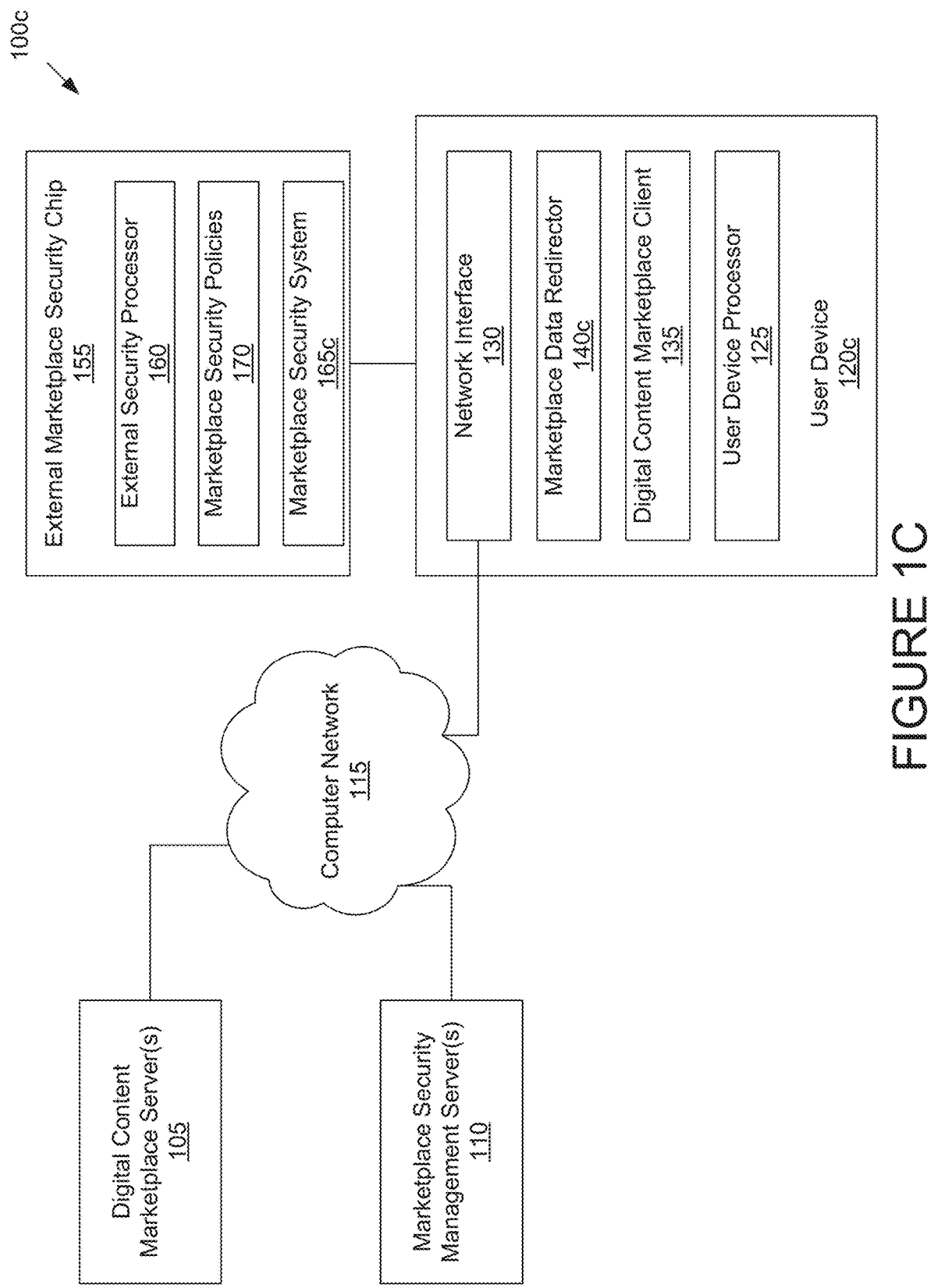
FIG. 1C depicts an example digital content marketplace security environment, according to some embodiments.

FIG. 1C depicts an example digital content marketplace security environment 100c, according to some embodiments. The digital content marketplace security environment 100c includes a digital content marketplace server 105, a marketplace security management server 110, a computer network 115, a user device 120c, and an external marketplace security chip 155. The digital content marketplace server 105, the marketplace security management server 110, and the computer network 115 are similar to their counterparts in FIG. 1A.

The user device 120c includes a user device processor 125, a network interface 130, a digital content marketplace client 135, and a marketplace data redirector(s) 140c. The user device processor 125, the network interface 130 and the digital content marketplace client 135 may be similar to their counterparts in FIG. 1A. In an embodiment, the marketplace data redirector(s) 140c includes hardware, firmware, and/or software to redirect the data going to and coming from the digital content marketplace client 135 to the external marketplace security chip 155.

The external marketplace security chip 155 may include hardware coupled to an external port of the user device 120c. In some embodiments, the external marketplace security chip 155 is coupled to the user device 120c using a Universal Serial Bus (USB) port, a network interface, or a data port.

The external marketplace security chip 155 may include an external security processor 160, a marketplace security system 165c, and marketplace security policies 170. The external security processor 160 may include shared or dedicated processor configured to execute the processes associated with the external marketplace security chip 155. The external security processor 160 may be separate and independent of the user device processor 125, and may comprise a secure processor. The external security processor 160 may implement encryption and other security algorithms to ensure the contents of the external marketplace security chip 155 are protected from unauthorized access. The external security processor 160 may store use secure memory of the external marketplace security chip 155 for its operations. In an embodiment, the external security processor may provide instructions to execute the marketplace security system 165c. The marketplace security system 165c and the marketplace security policies 170 may operate similarly to their counterparts in FIG. 1A.

FIG. 2 depicts an example marketplace security system 165, according to some embodiments. The marketplace security system 165 may correspond to the marketplace security system 165a, shown in FIG. 1A; the marketplace security system 165b, shown in FIG. 1B; or the marketplace security system 165c, shown in FIG. 1C. The marketplace security system 165 may include a marketplace data redirector interface engine 205, a digital content marketplace filter engine 210, a search request security analysis engine 215, a security policy interface engine 220, a search request response engine 225, a search results security analysis engine 230, a search results response engine 235, a digital content security analysis engine 240, a digital content security response engine 245, and a digital content marketplace client interface engine 250. One or more of the engines in the marketplace security system 165 may include shared or dedicated hardware, software, and/or firmware configured to perform functions described herein. In various embodiments, the marketplace security system 165 is implemented using a library of code that is executed by the user device processor 125. The marketplace security system 165 may be implemented using hardware, software, and/or firmware that can interface with the marketplace data redirector(s) 140 and/or the digital content marketplace client 135, shown in FIGS. 1A, 1B, and 1C.

The marketplace data redirector interface engine 205 may interface with the marketplace data redirector(s) 140 (shown as the marketplace data redirector(s) 140a in FIG. 1A and the marketplace data redirector(s) 140c in FIG. 1C). The marketplace data redirector interface engine 205 may send data to and receive data from the marketplace data redirector(s) 140. In some embodiments, the marketplace data redirector interface engine 205 incorporates some or all of the features of the marketplace data redirector(s) 140. For example, in embodiments (such as the embodiment depicted in FIG. 1B) where the user device 120 does not have a marketplace data redirector(s) 140, the marketplace data redirector interface engine 205 may identify marketplace communications to and from the digital content marketplace client 135 and may redirect these marketplace communications to the digital content marketplace filter engine 210. The marketplace data redirector interface engine 205 may provide to the digital content marketplace filter engine 210 requests to search digital content in the digital content marketplace server(s) 105, results of the search requests coming from the digital content marketplace server(s) 105, and/or requests to install and/or modify digital content on the user device 120a.

The digital content marketplace filter engine 210 may filter communications to and communications from the digital content marketplace client 135. More specifically, the digital content marketplace filter engine 210 may identify which communications fall under the marketplace security policies 170. For instance, the digital content marketplace filter engine 210 may filter search requests relating to searches for digital content on the digital content marketplace server(s) 105. As another example, the digital content marketplace filter engine 210 may filter the results of searches for digital content. As yet another example, the digital content marketplace filter engine 210 may filter requests to install, update, modify, etc. digital content. The digital content marketplace filter engine 210 may provide filtered communications to the other engines of the marketplace security system 165. For example, the digital content marketplace filter engine 210 may provide search requests to the search request security analysis engine 215. The digital content marketplace filter engine 210 may further provide results of search requests to the search results security analysis engine 230. Moreover, the digital content marketplace filter engine 210 may provide requests to install, update, modify, etc. digital content to the digital content security analysis engine 240.

Figure 3:
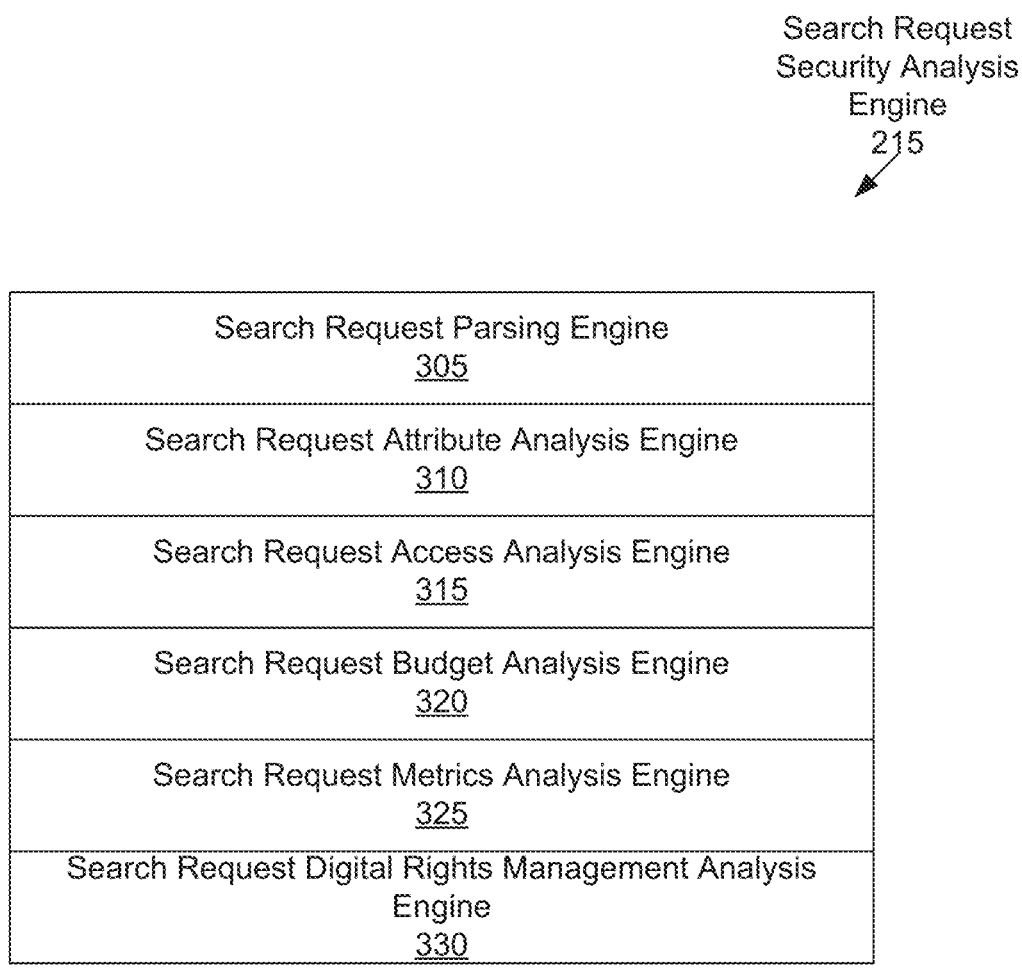
FIG. 3 depicts an example search request security analysis engine, according to some embodiments.

The search request security analysis engine 215 may identify portions of a search request that are relevant to determining whether the search request is likely to obtain unauthorized digital content. In some embodiments, a search request is in plain text format. In these embodiments, the search request security analysis engine 215 parses the plain text of the search request, and identifies digital content names, digital content publishers, and/or digital content categories. The search request security analysis engine 215 may further identify levels and/or types of access to the digital content marketplace server(s) 105 sought by a search request. The search request security analysis engine 215 may analyze whether the search request requests paid digital content and/or how much those items of paid digital content cost. The search request security analysis engine 215 may provide the information from the search requests to the security policy interface engine 220. FIG. 3 shows the search request security analysis engine 215 in greater detail.

The security policy interface engine 220 may provide relevant portions of the marketplace security policies 170 to the other engines of the marketplace security system 165. More specifically, the security policy interface engine 220 may obtain portions of the marketplace security policies 170 relating to the types of digital content marketplace search requests and/or search results that should be allowed or denied. The security policy interface engine 220 may also obtain portions of the marketplace security policies 170 to analyze digital content, as described further herein. In some embodiments, the security policy interface engine 220 is used to update the marketplace security policies 170. More specifically, the security policy interface engine 220 may receive updates to definitions, white- and/or black-lists, and/or other portions of the marketplace security policies 170 from the marketplace security management server(s) 110. The security policy interface engine 220 may provide these updates to the marketplace security policies 170 to ensure the security policies reflect the most recent definitions and lists.

The search request response engine 225 may decide whether a search request violates the marketplace security policies 170. The search request response engine 225 may interface with the search request security policy 605, shown in FIG. 6 and discussed further herein. For example, the search request response engine 225 may compare digital content names, publishers, and/or categories in the search request with white and/or black lists in the marketplace security policies 170. The search request response engine 225 may further compare the levels and/or types of access sought by a search request with levels and/or types of access deemed acceptable by the marketplace security policies 170. In some embodiments, the search request response engine 225 determines whether a search request for paid content is deemed acceptable by the marketplace security policies 170.

The search request response engine 225 may provide instructions to allow, deny, or modify the search request based on whether the search request violates the marketplace security policies 170. The search request response engine 225 may deny an unpermitted search request access to the computer network 115 and/or the digital content marketplace server(s) 105. The search request response engine 225 may also replace an unpermitted search request with another search request that is similar to the unpermitted search request, but that is in conformance with the marketplace security policies 170. As an example, the search request response engine 225 may replace search terms related to an unpermitted search request for network optimizing software with new search terms seeking a permitted type of software. As another example, the search request response engine 225 may remove inappropriate search terms (e.g., gambling-oriented or adult-oriented search terms) from a search. In some embodiments, the search request response engine 225 instructs the digital content marketplace client interface engine 250 whether a particular search request is to be allowed, denied, or modified.

Figure 4:
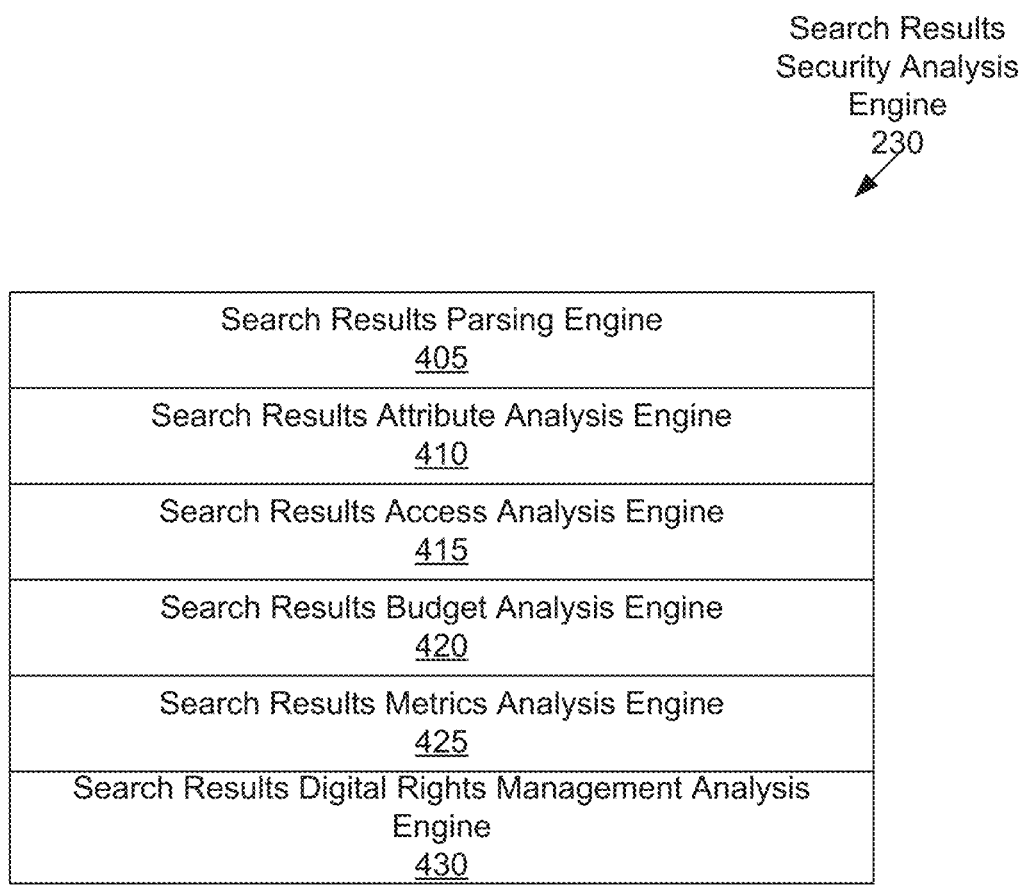
FIG. 4 depicts an example search results security analysis engine, according to some embodiments.

The search results security analysis engine 230 may identify portions of search results that are relevant to determining whether a set of search results violates the marketplace security policies 170. In some embodiments, the search results security analysis engine 230 parses search results from the digital content marketplace server(s) 105. The search results security analysis engine 230 may further analyze the parsed search results for digital content names, digital content publishers, digital content categories, levels and/or types of access sought by digital content, whether digital content is paid or free, how much paid digital content would cost, metrics related to the digital content, etc. The search results security analysis engine 230 may provide the relevant portions of search results to the search results response engine 235 and/or the digital content security analysis engine 240. FIG. 4 shows the search results security analysis engine 230 in greater detail.

The search results response engine 235 may decide whether specific search results violate the marketplace security policies 170. The search results response engine 235 may interface with the search results security policy 610, shown in FIG. 6 and discussed further herein. In some embodiments, the search results response engine 235 analyzes the digital content names, digital content publishers, digital content categories, levels and/or types of access sought by digital content, whether digital content is paid or free, how much paid digital content would cost, etc. provided by the search results security analysis engine 230 for compliance with the marketplace security policies 170. The search results response engine 235 may determine whether to allow, deny, or modify specific search results. The search results response engine 235 may suggest specific modifications to the search results. For example, the search results response engine 235 may remove unauthorized digital content identifiers or may substitute authorized digital content identifiers for unauthorized digital content in a search results page. The search results response engine 235 may instruct the digital content marketplace client interface engine 250 accordingly.

The digital content security analysis engine 240 may analyze digital content for compliance with the marketplace security policies 170. In some embodiments, the digital content security analysis engine 240 verifies attributes of digital content. "Attributes" of digital content may include properties of digital content or anything that can provide a description of digital content. Examples of attributes of digital content include titles, publishers, sizes, hardware requirements, metadata, and/or tags associated with digital content. The digital content security analysis engine 240 may also analyze digital content for malware, perform content analysis and/or risk assessment algorithms, and determine appropriate digital content metrics. Digital content "metrics," as used herein, may refer to measures related to how digital content is distributed. Examples of digital content metrics include popularity of digital content, ratings related to digital content, and the number of times digital content has been downloaded. The digital content security analysis engine 240 may further evaluate digital content for compliance with DRM rules (e.g., to ensure digital content is only accessed with an appropriate license). In various embodiments, the digital content security analysis engine 240 provides its analysis of the digital content before the digital content is installed on the user device 120.

Figure 5:
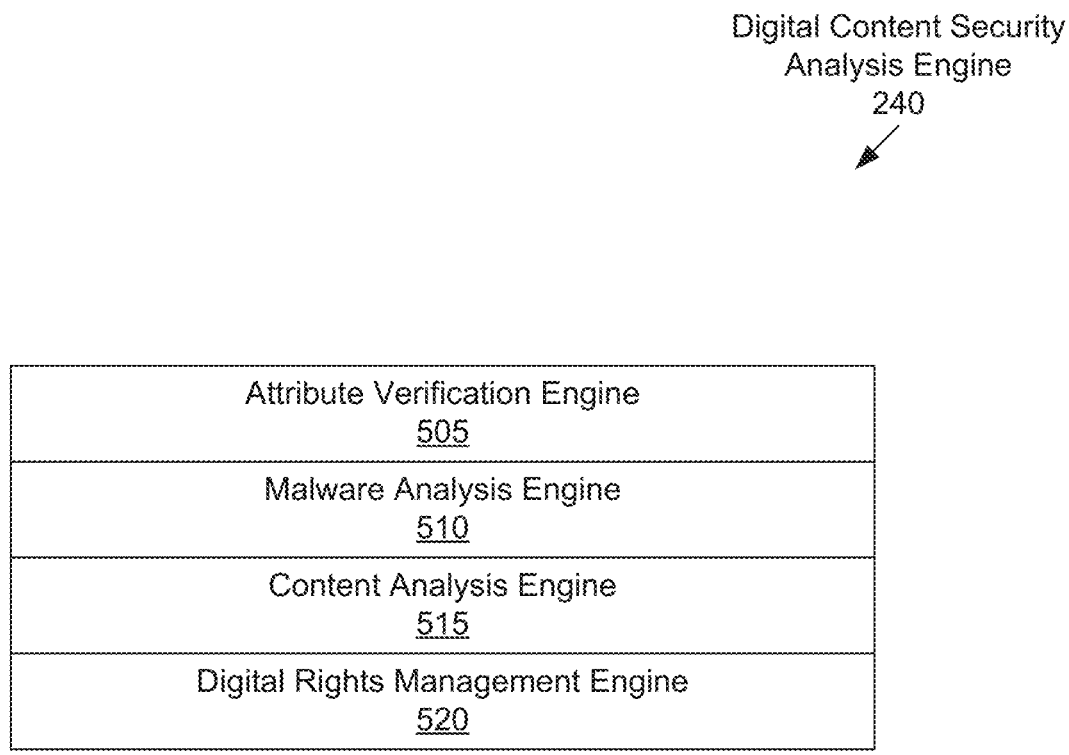
FIG. 5 depicts an example digital content security analysis engine, according to some embodiments.

The digital content security response engine 245 may decide whether specific digital content violates the marketplace security policies 170. The digital content security response engine 245 may interface with one or more of the digital content attribute verification policy 615, the digital content malware analysis security policy 620, the content analysis policy 625, and the digital rights management policy 630, shown in FIG. 6 and discussed further herein. The digital content security response engine 245 may verify attributes (names, publishers, publication dates, costs, etc.) of digital content, may evaluate the digital content for malware, and may perform content analysis on the digital content. The digital content security response engine 245 may also instruct the digital content marketplace client interface engine 250 to block and/or modify installation of non-compliant digital content. As a result, the digital content security analysis engine 240 may advantageously prevent installation of digital content that does not comply with the marketplace security policies 170. FIG. 5 shows the digital content security analysis engine 240 in greater detail.

The digital content marketplace client interface engine 250 may interface with the digital content marketplace client 135. The digital content marketplace client interface engine 250 may provide modified search requests, modified search results, and/or modified digital content to the user device 120 to display digital content that complies with the marketplace security policies 170. For example, the digital content marketplace client interface engine 250 may provide modified search requests to the user device 120 based on instructions from the search request response engine 225. As another example, the digital content marketplace client interface engine 250 may provide modified search results to the user device 120 based on corresponding instructions from the search results response engine 235. Moreover, the digital content marketplace client interface engine 250 may provide modified digital content to the user device 120 based on instructions from the digital content security response engine 245. In some embodiments, the digital content marketplace client interface engine 250 may instruct security software on the user device 120 to modify the search request, search results and/or digital content, before the digital content is presented and/or installed.

FIG. 3 depicts an example search request security analysis engine 215, according to some embodiments. The search request security analysis engine 215 may include a search request parsing engine 305, a search request attribute analysis engine 310, a search request access analysis engine 315, a search request budget analysis engine 320, search request metrics analysis engine 325, and a search request digital rights management engine 330. One or more of the engines in the search request security analysis engine 215 may include shared or dedicated hardware, software, and/or firmware configured to perform functions described herein.

The search request parsing engine 305 may parse a search request for language related to digital content, for digital content access levels, and for digital content budgets. In an embodiment, the search request is in plain text format. The search request parsing engine 305 may remove irrelevant characters (non-alphanumeric symbols, server names, hypertext functional strings, etc.) when performing parsing. The search request parsing engine 305 may provide the parsed search request to the search request attribute analysis engine 310, the search request access analysis engine 315, and/or the search request budget analysis engine 320.

The search request attribute analysis engine 310 may extract attributes of digital content from a parsed search request. For example, the search request attribute analysis engine 310 may identify digital content names, digital content publishers, the publication date of digital content, and digital content categories in a parsed search request. The search request attribute analysis engine 310 may provide the extracted information to the search request response engine 225 as discussed herein.

The search request access analysis engine 315 may analyze whether the search request is requesting digital content requiring secure resources of the user device 120. More specifically, the search request access analysis engine 315 may analyze whether the search request is seeking digital content that requires additional security to install (e.g., digital content that can modify operating system processes, digital content that interfaces with device drivers, digital content that is automatically loaded on startup, and digital content that requires administrator privileges to install). The search request access analysis engine 315 may provide the extracted information to the search request response engine 225 as discussed herein.

The search request budget analysis engine 320 may analyze whether the search request seeks paid content. In an embodiment, the search request budget analysis engine 320 analyzes whether the search request contains the word "free" (or some other word indicating free content), the word "paid" (or other word indicating paid content), currency symbols, etc. The search request budget analysis engine 320 may further evaluate the search request for the presence of words that indicate paid and/or premium content, such as "paid," "purchase," or "premium." The search request budget analysis engine 320 may provide the extracted information to the search request response engine 225 as discussed herein.

The search request metrics analysis engine 325 may analyze metrics related to a search request. The search request metrics analysis engine 325 may identify installation sizes and/or memory and other resources digital content in a search request is likely to consume. The search request metrics analysis engine 325 may further identify ratings (e.g., points, stars likes, positive reviews, and/or negative reviews). The search request metrics analysis engine 325 may provide the extracted information to the search request response engine 225, as discussed herein.

The search request digital rights management engine 330 may evaluate a search request for compliance with digital rights management policies. In some embodiments, the search request digital rights management engine 330 evaluates digital content in search requests for the presence or absence of watermarks, licenses, and other tamper-prevention technologies. The search request digital rights management engine 330 may interface with the digital rights management policy 630, shown in FIG. 6 and discussed herein. In various embodiments, the search request digital rights management engine 330 provides information about whether a search request complies with the digital rights management policy 630 to the search request response engine 225, as discussed herein.

FIG. 4 depicts an example search results security analysis engine 230, according to some embodiments. The search results security analysis engine 230 may include a search results parsing engine 405, a search results attribute analysis engine 410, a search results access analysis engine 415, a search results budget analysis engine 420, a search results metrics analysis engine 425, and a search results digital rights management engine 430. One or more of the engines in the search results security analysis engine 230 may include shared or dedicated hardware, software, and/or firmware configured to perform functions described herein.

The search results parsing engine 405 may parse search results for information related to digital content, for digital content access levels, for digital content budgets, and for digital content metrics. In some embodiments, the search results are in a binary encoded format. The search results parsing engine 405 may convert the search results to a text string, may remove irrelevant characters, and may extract the relevant information from the search results. The search results parsing engine 405 may provide the parsed search results to the search results attribute analysis engine 410, the search results access analysis engine 415, the search results budget analysis engine 420, and/or the digital content metrics analysis engine.

The search results attribute analysis engine 410 may extract information about digital content (e.g., digital content names, digital content publishers, and digital content categories) provided by the search results. The search results attribute analysis engine 410 may provide the extracted information to the search results response engine 235 as discussed herein.

The search results access analysis engine 415 may analyze whether the search results include digital content requiring secure resources of the user device 120. The search results access analysis engine 415 may determine whether search results are providing digital content that requires additional security to install. The search results access analysis engine 415 may provide the extracted information to the search results response engine 235 as discussed herein.

The search results budget analysis engine 420 may analyze whether the search results include paid content, and if so, prices and other information related to the paid content. More specifically, the search results budget analysis engine 420 may analyze whether the search results include the words "free" or "paid," currency symbols, etc. The search results budget analysis engine 420 may provide the extracted information to the search results response engine 235 as discussed herein.

The search results metrics analysis engine 425 may analyze metrics related to digital content in the search results. More specifically, the search results metrics analysis engine 425 may identify installation sizes and/or memory and other resources digital content is likely to consume. The search results metrics analysis engine 425 may further identify ratings related to digital content. For example, the search results metrics analysis engine 425 may identify points, stars, or likes digital content has received. The search results metrics analysis engine 425 may further identify positive and/or negative reviews of digital content. The search results metrics analysis engine 425 may provide the extracted information to the search results response engine 235 as discussed herein.

The search results digital rights management engine 430 may evaluate search results for compliance with digital rights management policies. In some embodiments, the search results digital rights management engine 430 evaluates digital content in search results for the presence or absence of watermarks, licenses, and other tamper-prevention technologies. For example, the search results digital rights management engine 430 may identify pirated or tampered digital content in search results. The search results digital rights management engine 430 may interface with the digital rights management policy 630, shown in FIG. 6 and discussed herein. In various embodiments, the search results digital rights management engine 430 provides information about whether search results comply with the digital rights management policy 630 to the search results response engine 235, as discussed herein.

FIG. 5 depicts an example digital content security analysis engine 240, according to some embodiments. The digital content security analysis engine 240 may include a attribute verification engine 505, a malware analysis engine 510, a content analysis engine 515, and a digital rights management engine 520. One or more of the engines in the digital content security analysis engine 240 may include shared or dedicated hardware, software, and/or firmware configured to perform functions described herein.

The attribute verification engine 505 may verify attributes of digital content based on known attributes of digital content. In an embodiment, the attribute verification engine

505 may interface with the digital content attribute verification policy 615, shown in FIG. 6 and discussed further herein. The attribute verification engine 505 may verify the title of digital content with titles known in the marketplace security policies 170 to correspond to the digital content. In some embodiments, the attribute verification engine 505 verifies a publisher of digital content in accordance with the security policy. The attribute verification engine 505 may further verify digital content descriptions or other attributes. The attribute verification engine 505 may provide the digital content security response engine 245 with information relating to whether or not digital content was successfully verified.

The malware analysis engine 510 may analyze digital content for malware. The malware analysis engine 510 may interface with the digital content malware analysis security policy 620, shown in FIG. 6 and discussed further herein. The malware analysis engine 510 may perform a virus scan of digital content. The malware analysis engine 510 may also analyze digital content for the presence of spyware, Trojan horses, keylogging software, adware, worms, and other types of malware. The malware analysis engine 510 may further perform Uniform Resource Locator (URL) categorization and/or filtering to limit access to unauthorized categories of URLs. In some embodiments, the malware analysis engine 510 verifies scripts, controls, and/or components of digital content in accordance with the marketplace security policies 170. The malware analysis engine 510 may provide the digital content marketplace client interface engine 250 with information relating to whether the digital content contained malware, and if so, the types of remedial actions to be taken. The malware analysis engine 510 may, for instance, recommend digital content be cleaned of malware, or digital content not be installed at all. The malware analysis engine 510 may provide information about the malware analysis to the digital content security response engine 245, as discussed herein.

The content analysis engine 515 may analyze digital content for the presence of content types that could compromise the security of the user device 120. The content analysis engine 515 may interface with the content analysis policy 625, shown in FIG. 6 and discussed further herein. The content analysis engine 515 may further analyze whether text or pictures in digital content contains inappropriate materials, such as gambling-oriented or adult-oriented materials. The content analysis engine 515 may provide the digital content marketplace client interface engine 250 with information relating to whether or not the digital content should be installed, cleaned, or modified. The content analysis engine 515 may provide content information to the digital content security response engine 245, as discussed herein.

The digital rights management engine 520 may evaluate digital content for compliance with digital rights management policies. In some embodiments, the digital rights management engine 520 evaluates digital content for the presence or absence of watermarks, licenses, and other tamper-prevention technologies. The digital rights management engine 520 may further identify pirated or tampered digital content. The digital rights management engine 520 may interface with the digital rights management policy 630, shown in FIG. 6 and discussed herein. In various embodiments, the digital rights management engine 520 provides information about whether digital content with the digital rights management policy 630 to the digital content security response engine 245, as discussed herein.

FIG. 6 depicts example marketplace security policies 170, according to some embodiments. The marketplace security policies 170 may include a search request security policy 605, a search results security policy 610, a digital content attribute verification policy 615, a digital content malware analysis security policy 620, a content analysis policy 625, and a digital rights management policy 630.

The search request security policy 605 may include a policy having white- and/or black-lists related to digital content marketplace search requests. For instance, the search request security policy 605 may include white- and/or black-lists of specific digital content or digital content publishers. The search request security policy 605 may further include rules relating to acceptable and/or unacceptable search words, phrases, and/or terms. For instance, the search request security policy 605 may provide lists that filtering of inappropriate search terms. In some embodiments, the search request security policy 605 includes rules relating to acceptable and/or unacceptable resources digital content in search requests may potentially require. More specifically, the search request security policy 605 may include lists of maximum allowed sizes of digital content; and maximum processor, memory, and/or network utilization allowed. The search request security policy 605 may further include rules relating to acceptable and/or unacceptable budgets the digital content in search requests may potentially require. As a result, the search request security policy 605 may include rules that specify whether paid content is allowed, or specify maximum allowable prices of paid digital content.

The search results security policy 610 may include a policy having security rules relating to authorized and/or unauthorized digital content marketplace search results. The search results security policy 610 may include security rules relating to authorized and/or unauthorized digital content, digital content publishers, words, terms, phrases, resources, and budgets. The search results security policy 610 may further include security rules relating to authorized and/or unauthorized metrics. More specifically, the search results security policy 610 may include security rules relating to authorized and/or unauthorized installation sizes, memory, ratings, points, stars, number of downloads and positive and/or negative reviews.

The digital content attribute verification policy 615 may include a policy containing definitions of verified attributes of digital content. The digital content attribute verification policy 615 may include titles of digital content, the names of publishers of digital content, digital content descriptions, and other information that can be used to verify the identity of digital content.

The digital content malware analysis security policy 620 may include a policy having malware definitions. In an embodiment, the digital content malware analysis security policy 620 includes antivirus and antispyware policies based on Clam Antivirus (AV), and/or additional antivirus and antispyware engines, such as McAfee, Kaspersky, Pandamay, or other free or subscription-based engines. The digital content malware analysis security policy 620 may further include Intrusion Detection System (IDS) and/or Intrusion Prevention System (IPS) policies to inspect signatures, protocols, and anomalies in digital content. The digital content malware analysis security policy 620 may also include URL Categorization Filtering policies that filter categories of URLs, such as gambling, news, adult content, webmail, etc.

The content analysis policy 625 may include a policy containing definitions of malicious content types. The content analysis policy 625 may include scripts, controls, components, etc. that are known to be malicious. The content analysis policy 625 may further include definitions that can identify gambling-oriented or adult-oriented materials in digital content. In some embodiments, the content analysis policy 625 implements dedicated High Risk Content Filtering (HRCF) algorithms that perform deep content analysis to verify content types. For example, the content analysis policy 625 may detect whether mimes, ActiveX controls, or scripts in digital content are different from what they say they are. The content analysis policy 625 may include definitions common to the digital content malware analysis security policy 620 for automatic rule adjustment based on URL categories. More specifically, the content analysis policy 625 may analyze digital content associated with higher risk URLs more stringently than digital content associated with lower risk URLs. In some embodiments, the content analysis policy 625 includes policies to strip pieces of malicious code from digital content.

The digital rights management policy 630 may include a policy relating to digital rights management. The digital rights management policy 630 may include information about watermarks or other technology that limits access to digital content without an appropriate license.

Figure 7:
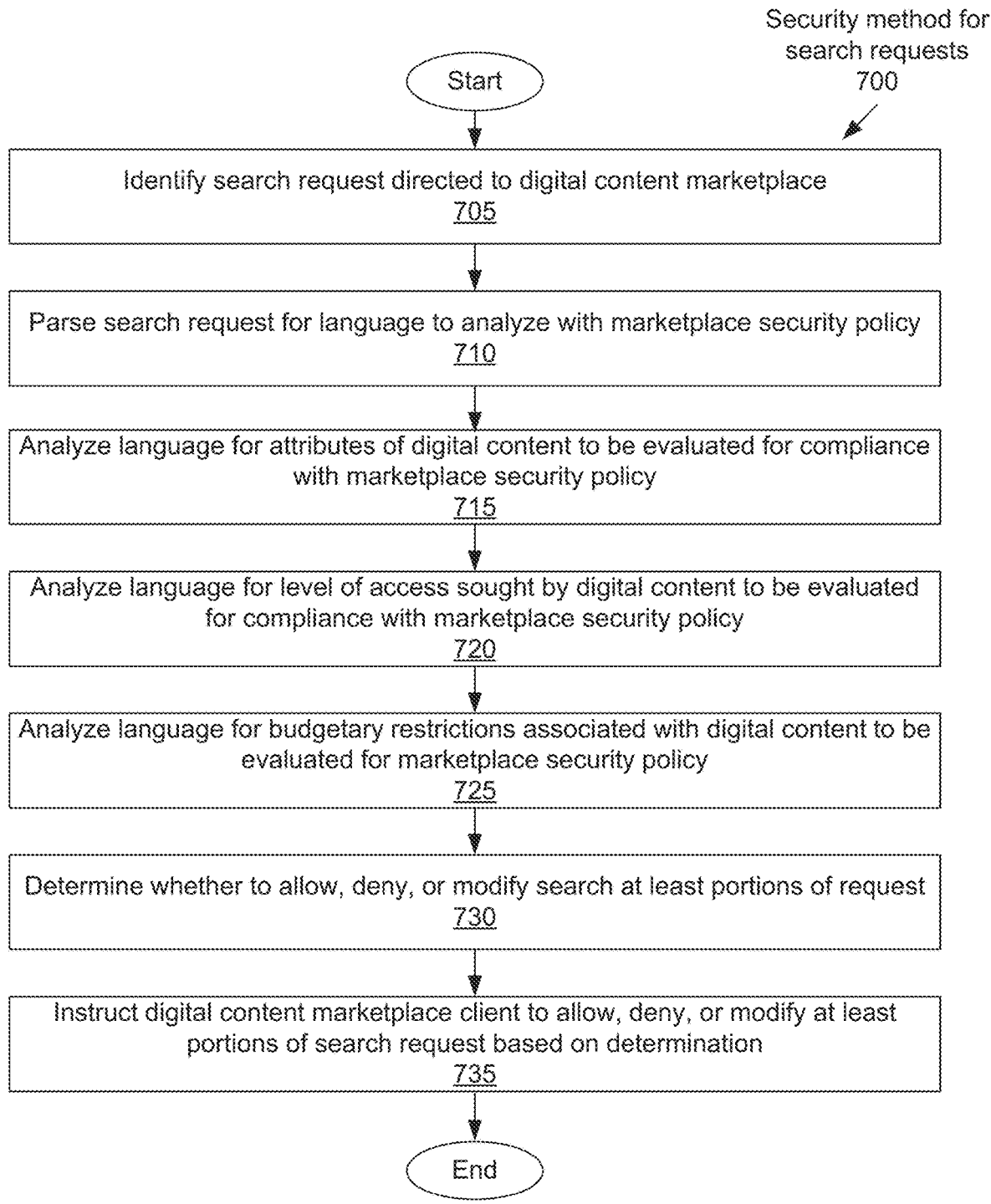
FIG. 7 is a flowchart of an example security method for search requests directed to a digital content marketplace.

FIG. 7 is a flowchart of an example method 700 of providing security to a user device for search requests directed to a digital content marketplace. The method 700 is discussed in conjunction with the elements of the digital content marketplace security environment 100, the marketplace security system 165, and the search request security analysis engine 215, shown in FIGS. 1-3. It is noted the steps in FIG. 7 are by way of illustration only, and that the method 700 may include elements not explicitly depicted, and that all elements are not necessary to perform the method 700.

At step 705, the digital content marketplace filter engine 210 identifies a search request directed to the digital content marketplace server(s) 105. More specifically, the digital content marketplace filter engine 210 may receive a character string corresponding to a search request. The character string may have been manually entered into a user interface of the digital content marketplace client 135 or may have been automatically generated by a process of the digital content marketplace client 135. In some embodiments, the search request includes language about digital content that is being sought. For example, the search request may include language such as the title of the digital content, the publisher of the digital content, or the publication date of the digital content.

At step 710, the search request parsing engine 305 parses the search request for language to analyze with a marketplace security policy, such as the marketplace security policies 170. The search request parsing engine 305 may parse the search request for relevant characters and/or character strings and may remove irrelevant characters, whitespaces, etc. from the search request. The search request parsing engine 305 may provide the parsed search request to one or more of the search request attribute analysis engine 310, the search request access analysis engine 315, and the search request budget analysis engine 320.

At step 715, the search request attribute analysis engine 310 analyzes the language for attributes of digital content to be evaluated for compliance with the marketplace security policy. More particularly, the search request attribute analysis engine 310 may identify the digital content names, publishers, publication dates, and categories in the language of the parsed search request.

At step 720, the search request access analysis engine 315 analyzes the language for a level of access sought by digital content to be evaluated for compliance with the marketplace security policy. In an embodiment, the search request access analysis engine 315 may review the parsed language of the search request to see if the search request is seeking digital content that requires additional security to install. The search request access analysis engine 315 may provide extracted access level information to the search request response engine 225.

At step 725, the search request budget analysis engine 320 analyzes the language for a budget factors associated with digital content to be evaluated for compliance with the marketplace security policy. More specifically, the search request budget analysis engine 320 may analyze the language of the parsed search request for words that indicate paid and/or free content, currency symbols, or other language indicating budget factors of the search request.

At step 730, the search request response engine 225 determines whether to allow, deny, or modify the search request. In various embodiments, the search request response engine 225 evaluates the search request in accordance with the search request security policy 605, discussed herein. The search requests may be compared to white-lists of permitted searches and/or black-lists of unpermitted search requests. At least portions of the search request may be replaced or cleaned with other language. The search request response engine 225 may provide the determination to the digital content marketplace client interface engine 250.

At step 735, the digital content marketplace client interface engine 250 instructs the digital content marketplace client 135 to allow, deny, or modify the search request based on the determination. The digital content marketplace client interface engine 250 may call APIs on the digital content marketplace client 135 that allow, deny, or modify the search request. For example, the digital content marketplace client interface engine 250 may allow the search request by calling a function on the digital content marketplace client 135 that sends the search to the computer network 115. The digital content marketplace client interface engine 250 may deny the search request by blocking that same function. The digital content marketplace client interface engine 250 may modify the search request by replacing or cleaning the search request with other language.

Figure 8:
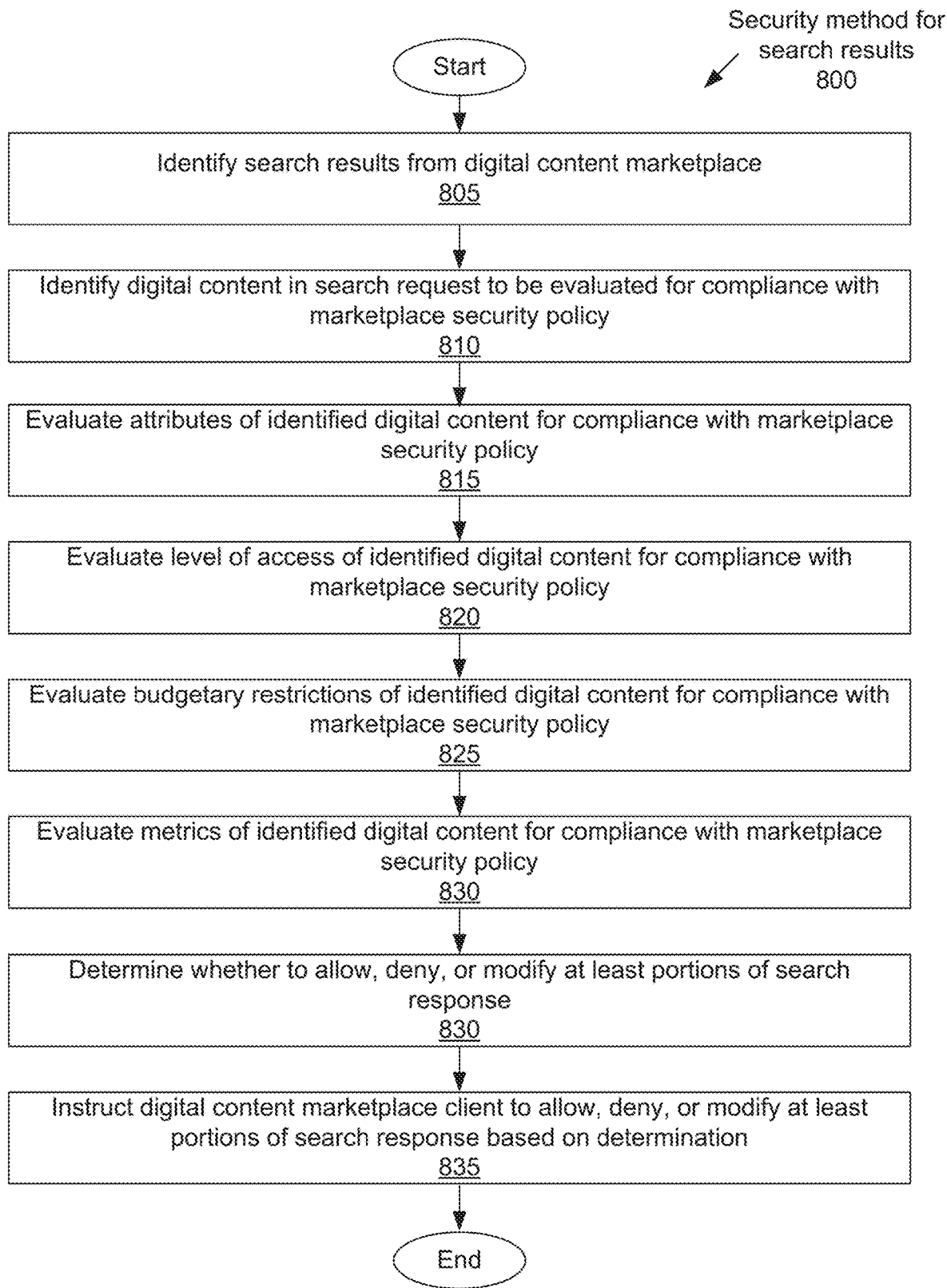
FIG. 8 is a flowchart of an example security method for search results from a digital content marketplace.

FIG. 8 is a flowchart of an example method 800 of providing security to a user device for search results from a digital content marketplace. The method 800 is discussed in conjunction with the elements of the digital content marketplace security environment 100, the marketplace security system 165, and the search results security analysis engine 230, shown in FIGS. 1, 2, and 4. It is noted the steps in FIG. 8 are by way of illustration only, and that the method 800 may include elements not explicitly depicted, and that all elements are not necessary to perform the method 800.

At step 805, the digital content marketplace filter engine 210 identifies search results from the digital content marketplace server(s) 105. The digital content marketplace filter engine 210 may identify search results that are directed to the digital content marketplace client 135. The digital content marketplace filter engine 210 may provide these search results to the search results parsing engine 405 in a binary encoded format, or other known or convenient format.

At step 810, the search results parsing engine 405 identifies digital content in the search results to be evaluated for compliance with a marketplace security policy. The search results parsing engine 405 may identify digital content names in the search results. In some embodiments, the search results parsing engine 405 identifies all known digital content names in the search results. The search results parsing engine 405 may also identify a limited set of digital content in the search results. The search results parsing engine 405 may provide the list of identified digital content to the other engines of the search results security analysis engine 230.

At step 815, the search results attribute analysis engine 410 evaluates attributes of the identified digital content for compliance with the marketplace security policy. The search results attribute analysis engine 410 may compare the attributes of the identified digital content with white-lists of permitted digital content and/or black-lists of unpermitted content in the search results security policy 610. In various embodiments, the search results attribute analysis engine 410 may evaluate the names, publishers, and/or categories associated with the identified digital content to see if the identified digital content should be allowed and/or disallowed.

At step 820, the search results access analysis engine 415 evaluates one or more levels of access of the identified digital content for compliance with the marketplace security policy. More specifically, the search results access analysis engine 415 may determine, based on the search results security policy 610, whether the identified digital content seeks an appropriate level of access to the user device 120.

At step 825, the search results budget analysis engine 420 evaluates budget factors of the identified digital content for compliance with the marketplace security policy. The search results budget analysis engine 420 may compare the identified digital content with known budget factors to see if the identified digital content comports with any digital content budget factors.

At step 825, the search results metrics analysis engine 425 evaluates metrics of the identified digital content for compliance with the marketplace security policy. More specifically, the search results metrics analysis engine 425 evaluate installation sizes, memory and/or other resources, ratings, points, stars, likes, etc. for the identified digital content. The search results metrics analysis engine 425 may provide the extracted information to the search results response engine 235 as discussed herein.

At step 830, the search results response engine 235 determines whether to allow, deny, or modify at least portions of the search response. The search results response engine 235 may evaluate the search results in accordance with the search results security policy 610, discussed herein. The search results may be compared to white-lists of permitted searches and/or black-lists of unpermitted search results. At least portions of the search results may be replaced with other language. The search results response engine 235 may provide the determination to the digital content marketplace client interface engine 250.

At step 835, the digital content marketplace client interface engine 250 instructs the digital content marketplace client 135 to allow, deny, or modify the search results based on the determination. More specifically, the digital content marketplace client interface engine 250 may call APIs on the digital content marketplace client 135 that allow, deny, or modify the search results. For example, the digital content marketplace client interface engine 250 may allow the search results by calling a function on the digital content marketplace client 135 that displays the search results on the user interface of the user device 120. The digital content marketplace client interface engine 250 may deny the search results by blocking the user interface display function. The digital content marketplace client interface engine 250 may modify the search results by replacing or cleaning the search results with other language.

Figure 9:
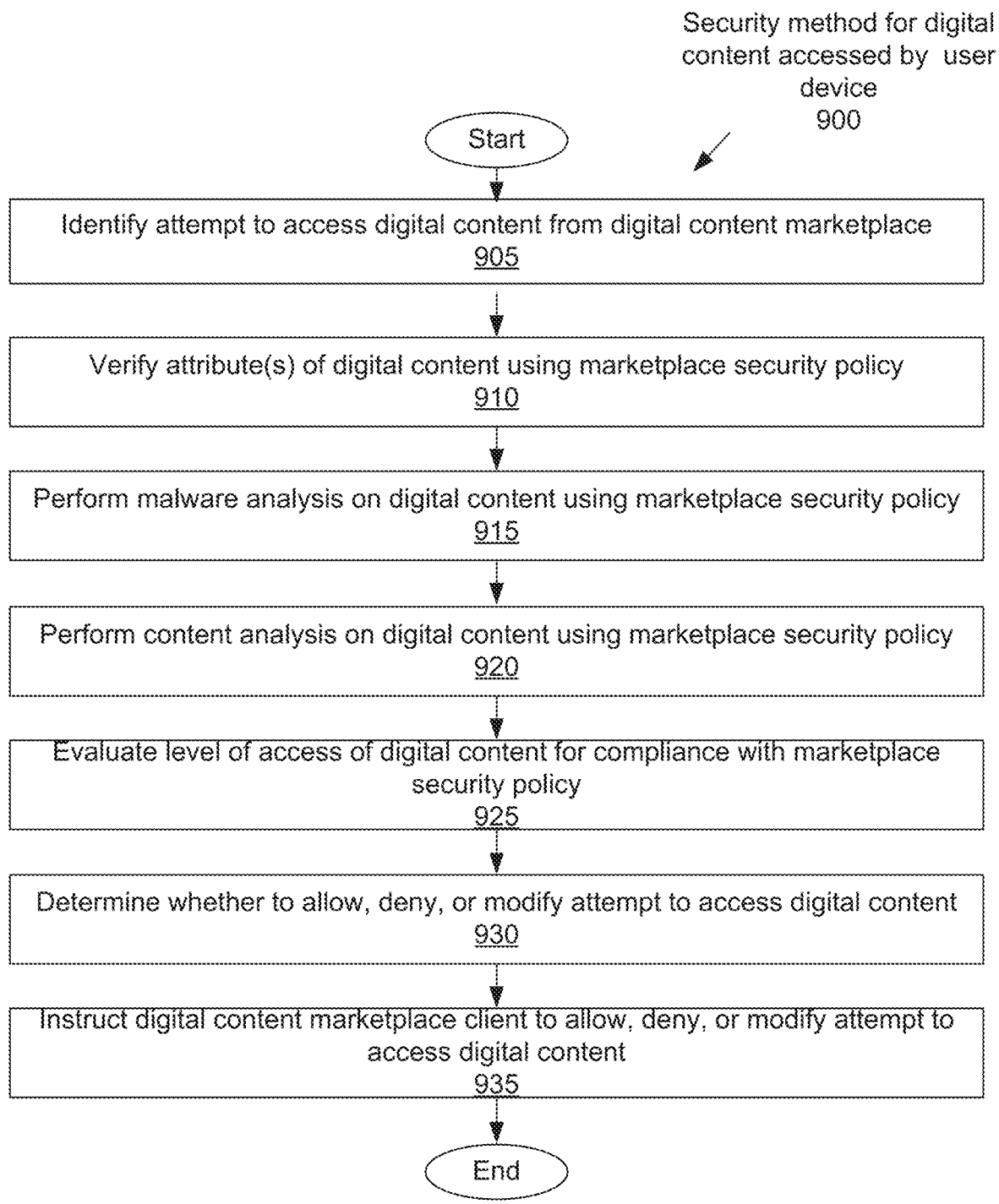
FIG. 9 is a flowchart of an example security method for digital content from a digital content marketplace accessed by the user device.

FIG. 9 is a flowchart of an example method 900 of providing security to a user device for digital content from a digital content marketplace accessed by the user device. The method 900 is discussed in conjunction with the elements of the digital content marketplace security environment 100, the marketplace security system 165, and the digital content security analysis engine 240, shown in FIGS. 1, 2, and 5. It is noted the steps in FIG. 9 are by way of illustration only, and that the method 900 may include elements not explicitly depicted, and that all elements are not necessary to perform the method 900.

At step 905, the digital content marketplace filter engine 210 identifies an attempt to access digital content from the digital content marketplace server(s) 105. For example, the digital content marketplace filter engine 210 may identify an attempt to install digital content on the user device 120. The digital content marketplace filter engine 210 may also identify an attempt to automatically or manually update or modify digital content on the user device 120.

At step 910, the attribute verification engine 505 verifies one or more attributes of the digital content using the marketplace security policies 170. The attribute verification engine 505 may use the digital content attribute verification policy 615 for this step. The attribute verification engine 505 may verify the digital content name, publisher, etc. By verifying this information, the attribute verification engine 505 prevents phishing attempts and other schemes using spoofed file names and/or content types.

At step 915, the malware analysis engine 510 performs malware analysis on the digital content using the marketplace security policies 170. The digital content may perform the malware analysis using the digital content malware analysis security policy 620. The malware analysis engine 510 may scan the digital content for viruses, spyware, adware, and other malware.

At step 920, the content analysis engine 515 performs content analysis on the digital content using the marketplace security policies 170. The content analysis engine 515 may evaluate the scripts, controls, components, etc. in the digital content using the content analysis policy 625.

At step 925, the digital content access analysis engine 525 evaluates a level of access of the digital content for compliance with the marketplace security policies 170. At step 930, the digital content budget analysis engine 530 evaluates budget factors of the digital content for compliance with the marketplace security policies 170.

At step 930, the digital content security response engine 245 determines whether to allow, deny, or modify the attempt to access the digital content. At step 935, the digital content marketplace client interface engine 250 instructs the digital content marketplace client 135 to allow, deny, or modify the attempt to access the digital content. If the access attempt is an attempt to install the digital content, the digital content marketplace client interface engine 250 may call APIs that allow or block the installation processes accordingly. The digital content marketplace client interface engine 250 may also modify the access attempt by installing similar or cleaned digital content in place of the digital content that was evaluated.

Figure 10:
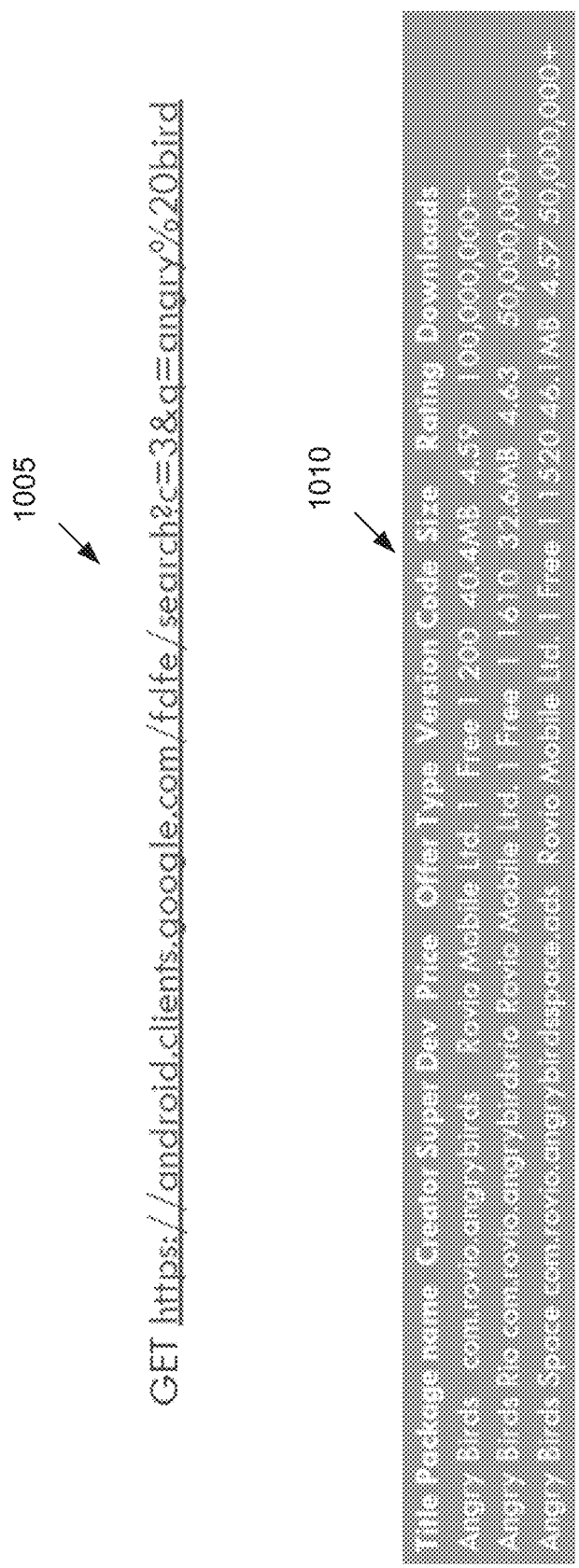
FIG. 10 depicts an example of a search request and search results, according to some embodiments.

FIG. 10 depicts an example of a search request 1005 and search results 1010, according to some embodiments. As shown, the search request 1005 is in text format. The search results 1010 have been translated from binary encoded format to a text format. The search results 1010 include various attributes of the application "Angry Birds," such as title, package, name, creator, the developer, price, the offer, type, version, code. The search results 1010 further show the rating and the number of downloads of the application.

Figure 11:
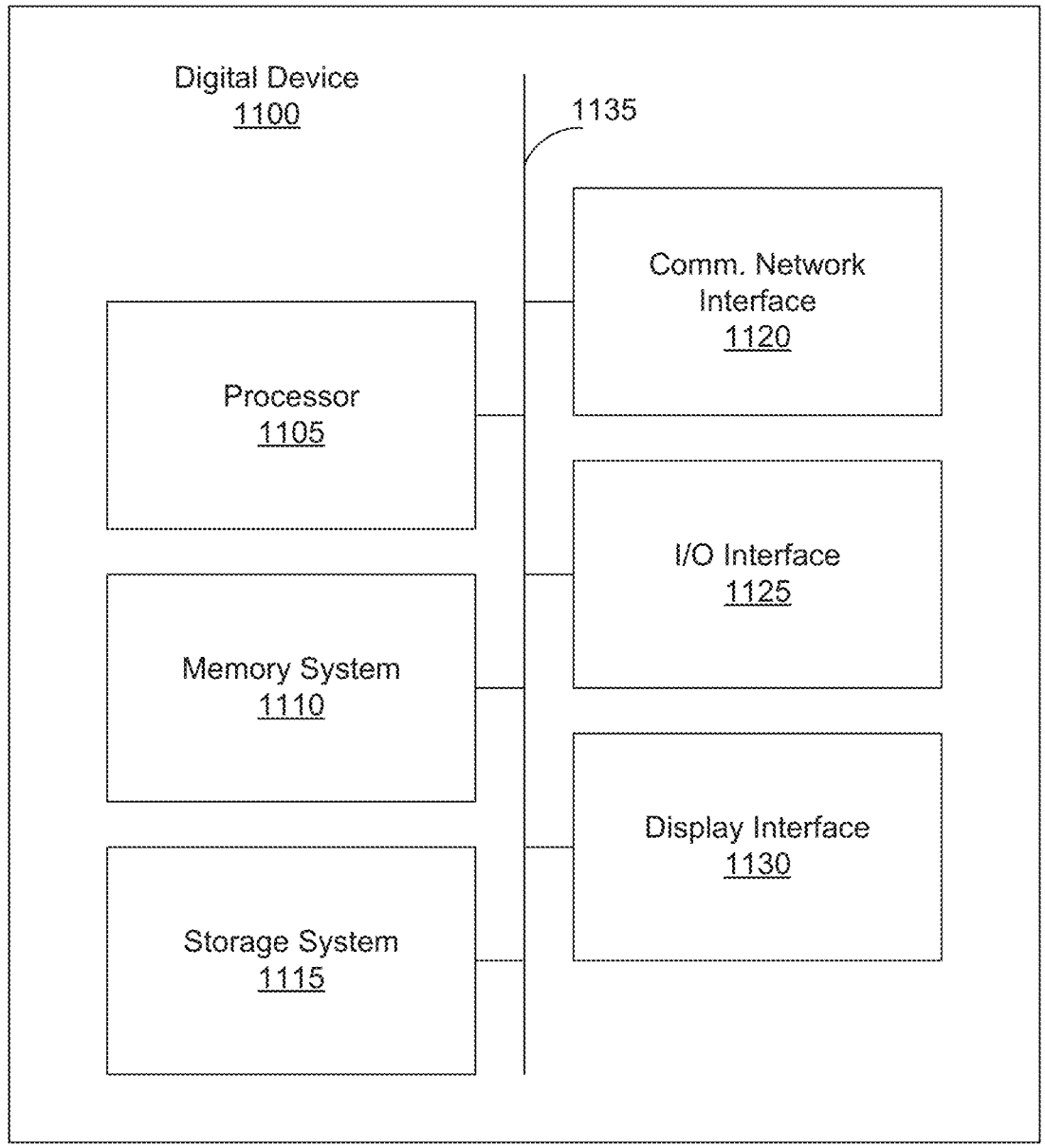
FIG. 11 depicts an example digital device, according to some embodiments.

FIG. 11 depicts an example of a digital device 1100, according to some embodiments. The digital device 1100 comprises a processor 1105, a memory system 1110, a storage system 1115, a communication network interface 1120, an Input/output (I/O) interface 1125, a display interface 1130, and a bus 1135. The bus 1135 may be communicatively coupled to the processor 1105, the memory system 1110, the storage system 1115, the communication network interface 1120, the I/O interface 1125, and the display interface 1130.

In some embodiments, the processor 1105 comprises circuitry or any processor capable of processing the executable instructions. The memory system 1110 comprises any memory configured to store data. Some examples of the memory system 1110 are storage devices, such as RAM or ROM. The memory system 1110 may comprise the RAM cache. In various embodiments, data is stored within the memory system 1110. The data within the memory system 1110 may be cleared or ultimately transferred to the storage system 1115.

The storage system 1115 comprises any storage configured to retrieve and store data. Some examples of the storage system 1115 are flash drives, hard drives, optical drives, and/or magnetic tape. In some embodiments, the digital device 1100 includes a memory system 1110 in the form of RAM and a storage system 1115 in the form of flash data. Both the memory system 1110 and the storage system 1115 comprise computer readable media which may store instructions or programs that are executable by a computer processor including the processor 1105.

The communication network interface (com. network interface) 1120 may be coupled to a data network. The communication network interface 1120 may support communication over an Ethernet connection, a serial connection, a parallel connection, or an ATA connection, for example. The communication network interface 1120 may also support wireless communication (e.g., 802.11 a/b/g/n, WiMAX, LTE, 3G, 2G). It will be apparent to those skilled in the art that the communication network interface 1120 may support many wired and wireless standards.

The optional input/output (I/O) interface 1125 is any device that receives input from the user and output data. The display interface 1130 is any device that may be configured to output graphics and data to a display. In one example, the display interface 1130 is a graphics adapter.

It will be appreciated by those skilled in the art that the hardware elements of the digital device 1100 are not limited to those depicted in FIG. 11. A digital device 1100 may comprise more or less hardware elements than those depicted. Further, hardware elements may share functionality and still be within various embodiments described herein. In one example, encoding and/or decoding may be performed by the processor 1105 and/or a co-processor located on a GPU.

In an embodiment, the processor 1105 may correspond to the user device processor 125 of the user device 120. The processor 1105 may also correspond to the security chip processor 150 of the internal marketplace security chip 145, or the external security processor 160 of the external marketplace security chip 155. In some embodiments, the storage system 1115 may store the marketplace security policies 170 and/or other information relevant to the security of the digital content marketplace server(s) 115.

The above-described functions and components may be comprised of instructions that are stored on a storage medium such as a computer readable medium. The instructions may be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment," "an embodiment," "some embodiments," "various embodiments," "certain embodiments," "other embodiments," "one series of embodiments," or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

The invention claimed is:

1. A system comprising:
a security chip configured to be coupled to a user device; and
digital storage storing user device program code, the user device program code configured to be executed by at least one user device hardware processor on the user device, the user device program code when executed by the at least one user device hardware processor causing the user device to:
identify using the at least one user device hardware processor a digital content request for a first digital content item, the digital content request being received from a digital content marketplace client, the digital content marketplace client configured to direct a request execution process on the user device to forward the digital content request to a digital content marketplace server that manages a plurality of digital content items including the first digital content item, the request execution process configured to forward the digital content request to the digital content marketplace server in accordance with the digital content request;

intercept using the at least one user device hardware processor the digital content request before the digital content request is forwarded to the digital content marketplace server; and transmit using the at least one user device hardware processor the digital content request to the security chip; and the security chip comprising:

at least one security device hardware processor, the at least one security device hardware processor being different than the at least one user device hardware processor; and memory storing security device program code, the security device program code being executable by the at least one security device hardware processor, the security device program code when executed by the at least one security device hardware processor causing the security chip to:

receive using the at least one security device hardware processor the digital content request before the digital content request is forwarded to the digital content marketplace server;

review using the at least one security device hardware processor the digital content request against a security policy, including at least one of review the digital content request against a whitelist of approved digital content requests or against a blacklist of disapproved digital content requests, review the first digital content item against a whitelist of approved digital content items or against a blacklist of disapproved digital content items, or review an attribute associated with the first digital content item against a whitelist of approved digital content item attributes or against a blacklist of disapproved digital content item attributes; and allow, block or modify using the at least one security device hardware processor the digital content request based on whether the review of the digital content request determines that the digital content request conforms to the security policy.

2. The system of claim 1, wherein the digital content request comprises a search request for several digital content items including the first digital content item.

3. The system of claim 1, wherein the attribute includes title, publisher, size, hardware requirements, metadata or tags.

4. The system of claim 1, wherein the security policy includes at least one metric associated with each digital content item.

5. The system of claim 4, wherein the at least one metric includes number of downloads, user rating, or popularity.

6. The system of claim 1, wherein the digital content marketplace server manages a database of media items.

7. The system of claim 1, wherein the digital content marketplace server manages a database of application items.

8. A method comprising:
identifying, by at least one user device hardware processor on a user device, a digital content request for a first digital content item, the digital content request being received from a digital content marketplace client, the digital content marketplace client configured to direct a request execution process on the user device to forward the digital content request to a digital content marketplace server that manages a plurality of digital content items including the first digital content item, the request execution process configured to forward the digital content request to the digital content marketplace server in accordance with the digital content request intercepting, by the at least one user device hardware processor, the digital content request before the digital content request is forwarded to the digital content marketplace server;

transmitting, by the at least one user device hardware processor, the digital content request to at least one security device hardware processor of a security chip for the at least one security device hardware process to review the digital content request against a security marketplace policy before the digital content request is forwarded to the digital content marketplace server, the at least one security device hardware processor being different than the at least one user device hardware processor;

receiving, by the at least one security device hardware processor, the digital content request before the digital content request is forwarded to the digital content marketplace server;

reviewing, by the at least one security device hardware processor, the digital content request against the security policy, including at least one of reviewing the digital content request against a whitelist of approved digital content requests or against a blacklist of disapproved digital content requests, reviewing the first digital content item against a whitelist of approved digital content items or against a blacklist of disapproved digital content items, or reviewing an attribute associated with the first digital content item against a whitelist of approved digital content item attributes or against a blacklist of disapproved digital content item attributes; and allowing, blocking or modifying, by the at least one security device hardware processor, the digital content request based on whether the review of the digital content request determines that the digital content request conforms to the security policy.

9. The method of claim 8, wherein the digital content request comprises a search request for multiple digital content items including the first digital content item.

10. The method of claim 8, wherein the attribute includes title, publisher, size, hardware requirements, metadata or tags.

11. The method of claim 8, wherein the security policy includes at least one metric associated with each digital content item.

12. The method of claim 11, wherein the at least one metric includes number of downloads, user rating, or popularity.

13. The method of claim 8, wherein the digital content marketplace server manages a database of media items.

14. The method of claim 8, wherein the digital content marketplace server manages a database of application items.

* * * * *